United States Patent
Ashrafi

(10) Patent No.: US 10,405,197 B2
(45) Date of Patent: Sep. 3, 2019

(54) SYSTEM AND METHOD FOR USING DEDICATED PAL BAND FOR CONTROL PANE AND GAA BAND AS WELL AS PARTS OF PAL BAND FOR DATA PLAN ON A CBRS NETWORK

(71) Applicant: NxGen Partners IP, LLC, Dallas, TX (US)

(72) Inventor: Solyman Ashrafi, Plano, TX (US)

(73) Assignee: NxGen Partners IP, LLC, Dallas, TX (US)

( * ) Notice: Subject to any disclaimer, the term of this patent is extended or adjusted under 35 U.S.C. 154(b) by 0 days.

(21) Appl. No.: 15/835,078

(22) Filed: Dec. 7, 2017

(65) Prior Publication Data

US 2019/0069187 A1 Feb. 28, 2019

Related U.S. Application Data

(63) Continuation-in-part of application No. 15/689,769, filed on Aug. 29, 2017, now Pat. No. 10,314,049.
(Continued)

(51) Int. Cl.
*H04W 72/00* (2009.01)
*H04W 16/24* (2009.01)
(Continued)

(52) U.S. Cl.
CPC ......... *H04W 16/24* (2013.01); *H04L 41/0823* (2013.01); *H04L 41/5054* (2013.01); *H04W 36/22* (2013.01); *H04W 52/0206* (2013.01); *H04W 84/00* (2013.01); *G06F 2009/45595* (2013.01); *H04L 41/0893* (2013.01); *H04L 41/12* (2013.01); *H04L 41/5087* (2013.01); *H04L 43/0852* (2013.01); *H04L 45/64* (2013.01); *H04W 24/04* (2013.01); *H04W 28/02* (2013.01); *H04W 28/16* (2013.01);
(Continued)

(58) Field of Classification Search
None
See application file for complete search history.

(56) References Cited

U.S. PATENT DOCUMENTS

| | | | |
|---|---|---|---|
| 2015/0055623 A1* | 2/2015 | Li | H04W 40/04 370/331 |
| 2015/0195745 A1* | 7/2015 | Farmanbar | H04W 28/12 370/236 |

(Continued)

OTHER PUBLICATIONS

A. Doria et al.; General switch management protocol (GSMP) V3; Tech. Rep., 2002; doi: http://dx.doi.org/10.17487/RFC3292, Best Available Date: Jun. 2002.
(Continued)

*Primary Examiner* — San Htun

(57) ABSTRACT

A system for providing small cell backhaul communication includes a small cell backhaul network including a plurality of small cell network nodes. A software defined network (SDN) controller controls link configuration between the plurality of small cell network nodes of the small cell backhaul network. The SDN controller communicates control channel information with the plurality of small cell network nodes over a primary access license (PAL) control channel using a citizens broadband radio services (CBRS) band that enables software defined networking.

26 Claims, 20 Drawing Sheets

Related U.S. Application Data

(60) Provisional application No. 62/381,073, filed on Aug. 30, 2016, provisional application No. 62/381,071, filed on Aug. 30, 2016.

(51) Int. Cl.

| | | |
|---|---|---|
| *H04W 36/22* | (2009.01) | |
| *H04L 12/24* | (2006.01) | |
| *H04W 84/00* | (2009.01) | |
| *H04W 52/02* | (2009.01) | |
| *G06F 9/455* | (2018.01) | |
| *H04W 28/02* | (2009.01) | |
| *H04L 12/715* | (2013.01) | |
| *H04L 12/26* | (2006.01) | |
| *H04W 24/04* | (2009.01) | |
| *H04W 28/16* | (2009.01) | |
| *H04W 92/12* | (2009.01) | |

(52) U.S. Cl.
CPC ........ *H04W 52/0203* (2013.01); *H04W 92/12* (2013.01); *Y02D 70/10* (2018.01); *Y02D 70/12* (2018.01); *Y02D 70/122* (2018.01); *Y02D 70/126* (2018.01); *Y02D 70/1224* (2018.01); *Y02D 70/1262* (2018.01); *Y02D 70/14* (2018.01); *Y02D 70/142* (2018.01); *Y02D 70/146* (2018.01); *Y02D 70/22* (2018.01)

(56) References Cited

U.S. PATENT DOCUMENTS

| | | | | |
|---|---|---|---|---|
| 2015/0207724 | A1* | 7/2015 | Choudhury | H04L 41/12 370/255 |
| 2016/0127246 | A1* | 5/2016 | Ashwood-Smith | H04L 47/283 370/350 |
| 2016/0285750 | A1* | 9/2016 | Saquib | H04L 41/0677 |
| 2016/0330743 | A1* | 11/2016 | Das | H04W 76/10 |
| 2017/0188241 | A1* | 6/2017 | Mueck | H04W 16/14 |
| 2018/0014304 | A1* | 1/2018 | Khoshnevisan | H04W 24/08 |

OTHER PUBLICATIONS

T. Wu, L. Rui, A. Xiong, and S. Guo; An automation PCI allocation method for eNodeB and home eNodeB cell; Proc. IEEE 6th Int. Conf. Wireless Commun. Netw. Mobile Comput. (WiCOM); Sep. 2010, pp. 1-4.
A. Berl, H. de Meer, H. Hlavacs, and T. Treutner; Virtualization in energy-efficient future home environments; IEEE Commun. Mag., vol. 47, No. 12, pp. 62-67, Dec. 2009.
R. Mortier et al.; Control and understanding: Owning your home net-work; Proc. IEEE 4th Int. Conf. Commun. Syst. Netw. (COMSNETS), Jan. 2012, pp. 1-10, Best Available Date: 2012.
H. Ludwig et al.; Web service level agreement (WSLA) language specification; IBM Corp., New York, NY, USA; Tech. Rep., 2003, pp. 815-824, Best Available Date: Jan. 28, 2003.
F. T. Leighton and D. M. Lewin; Content delivery network using edge-of-network servers for providing content delivery to a set of participating content providers; U.S. Pat. No. 6,553,413, Apr. 22, 2003.
E D. Zwicky, S. Cooper, and D. B. Chapman; Building Internet Firewalls; Sebastopol, CA, USA: O'Reilly Media, 2000, Best Available Date: Jun. 2000.
H. Hawilo, A. Shami, M. Mirahmadi, and R. Asal; NFV: State of the art, challenges, and implementation in next generation mobile net-works (vEPC); IEEE Netw., vol. 28, No. 6, pp. 18-26, Nov./Dec. 2014.
A. Gember et al. (2013); Stratos: A network-aware orchestration layer for virtual middleboxes in clouds; [Online]. Available: http://arxiv.org/abs/1305.0209, Version 2, Mar. 11, 2014.
J. Case, M. Fedor, M. Schoffstall, and J. Davin; A Simple Network Management Protocol (SNMP); document 1157, 1989, Best Available Date: May 1990.
N. Handigol, S. Seetharaman, M. Flajslik, N. McKeown, and R. Johari; Plug-n-serve: Load-balancing Web traffic using OpenFlow; Proc. ACM SIGCOMM Demo, 2009, pp. 1-2, Best Available Date: Aug. 2009.
A. Doria et al.; Forwarding and Control Element Separation (ForCES) Protocol Specification; document 5810; 2010, Best Available Date: Mar. 2010.
B. Raghavan, M. Casado, T. Koponen, S. Ratnasamy, A. Ghodsi, and S. Shenker; Software-defined Internet architecture: Decoupling archi-tecture from infrastructure; Proc. 11th ACM Workshop Hot Topics Netw., 2012, pp. 43-48.
R. Bifulco, R. Canonico, M. Brunner, P. Hasselmeyer, and F. Mir; A practical experience in designing an OpenFlow controller; Proc. IEEE Eur. Workshop Softw. Defined Netw. (EWSDN), Oct. 2012, pp. 61-66.
G. Lu et al.; Serverswitch: A programmable and high performance platform for data center networks; Proc. NSDI, vol. 11. 2011, pp. 1-14, Best Available Date: Mar. 1, 2011.
D. Drutskoy, E. Keller, and J. Rexford; Scalable network virtualization in software-defined networks; IEEE Internet Comput., vol. 17, No. 2, pp. 20-27, Mar./Apr. 2013.
N. McKeown et al.; OpenFlow: Enabling innovation in campus net-works; ACM SIGCOMM Comput. Commun. Rev., vol. 38, No. 2, pp. 69-74, 2008, Best Available Date: Mar. 14, 2008.
A. Dixit, F. Hao, S. Mukherjee, T. V. Lakshman, and R. Kompella; Towards an elastic distributed SDN controller; Proc. 2nd ACM SIGCOMM Workshop Hot Topics Softw. Defined Netw., 2013, pp. 7-12.
D. Joseph and I. Stoica; Modeling middleboxes; IEEE Netw., vol. 22, No. 5, pp. 20-25, Sep./Oct. 2008.
J. Martins et al.; ClickOS and the art of network function virtualization; Proc. 11th USENIX Symp. Netw. Syst. Design Implement. (NSDI), Seattle, WA, USA, 2014, pp. 459-473, Best Available Date: Apr. 2-4, 2014.
P. Quinn and T. Nadeau; Service Function Chaining Problem Statement; document draft-quinn-sfc-problem-statement-02, 2013, Best Available Date: Apr. 2015.
Y. Li, M. Chen; Software-Defined Network Function Virtualization: A Survey; IEEE 2015, pp. 2169-3536, Best Available Date: Dec. 16, 2015.
A. Hurtado-Borras, J. Pala-Sole, D. Camps-Mur, and S. Sallent-Ribes; sdn wireless backhauling or small cells; Communications (ICC); 2015 IEEE International Conference; pp. 3897-3902; Jun. 2015.
Kari Seppänen, Jorma Kilpi, and Tapio Suihko; Integrating wmn based mobile backhaul with sdn control; Mob.Netw. Appl., 20(1):32-39; Feb. 2015.
Open Networking Foundation; Openflow switch specification; Version 1.1.0 implemented (wire protocol 0x02), Version 1.0.0, Dec. 31, 2009.
D. Katz and D. Ward; Bidirectional Forwarding Detection (BFD). RFC 5880 (Proposed Standard); Jun. 2010; Updated by RFC 7419.
N.L.M. van Adrichem, B.J. Van Asten, and F.A. Kuipers; Fast recovery in software-defined networks; Software Defined Networks (EWSDN), 2014 Third European Workshop; pp. 61-66; Sep. 2014, Best Available Date: online Jul. 1, 2014.
P. Sun, M. Yu, M. J. Freedman, J. Rexford, and D. Walker; Hone: Joint host-network traffic management in software-defined networks; Journal of Network and Systems Management, vol. 23, No. 2; 2015.
P. Dely, A. Kassler, and N. Bayer; Openflow for wireless mesh networks; Computer Communications and Networks (ICCCN), 2011; Proceedings of 20th International Conference; Jul. 2011, Best Available Date: Jul. 31-Aug. 4, 2011.
A. Patro and S. Banerjee; Outsourcing coordination and management of home wireless access points through an open api; Computer Communications (INFOCOM); 2015 IEEE Conference on. IEEE; 2015.

(56) References Cited

OTHER PUBLICATIONS

K. Phemius and M. Bouet; Monitoring latency with openflow; Network and Service Management (CNSM), 2013; 9th International Conference on. IEEE; 2013.

* cited by examiner

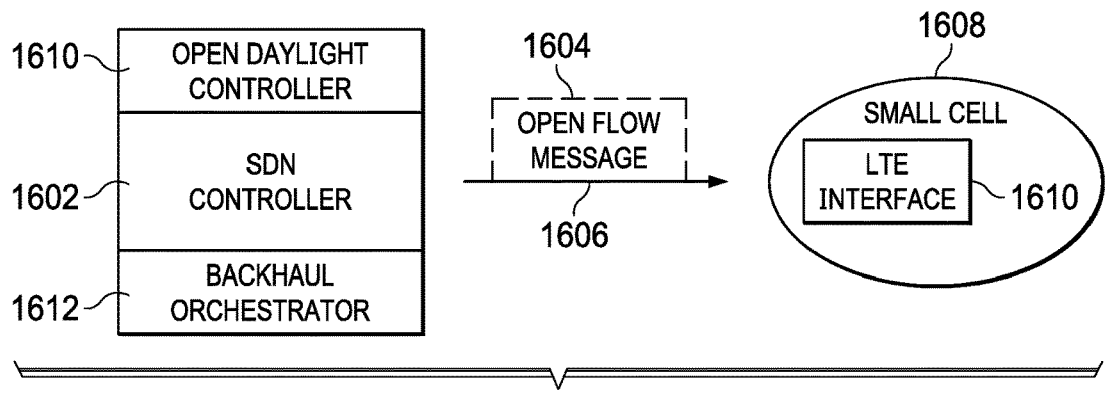
FIG. 16
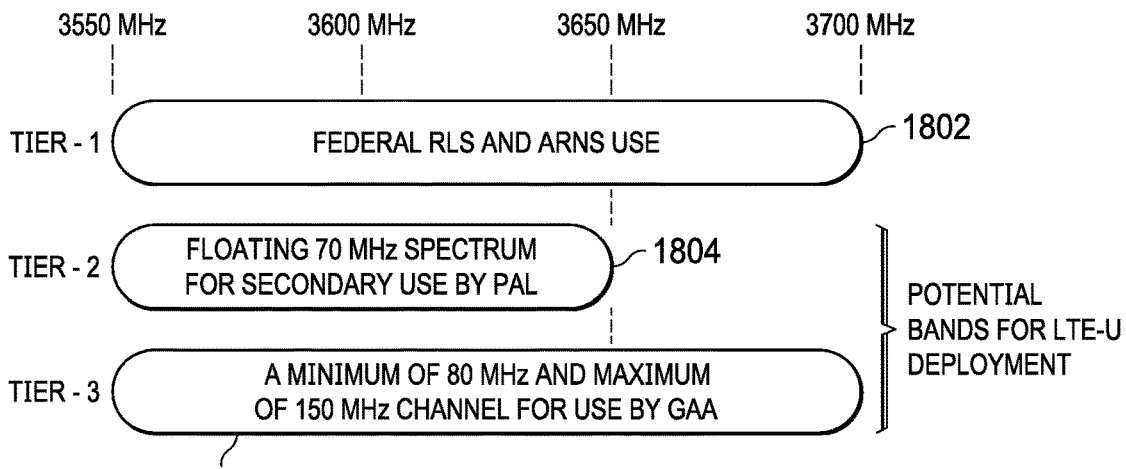
FIG. 18
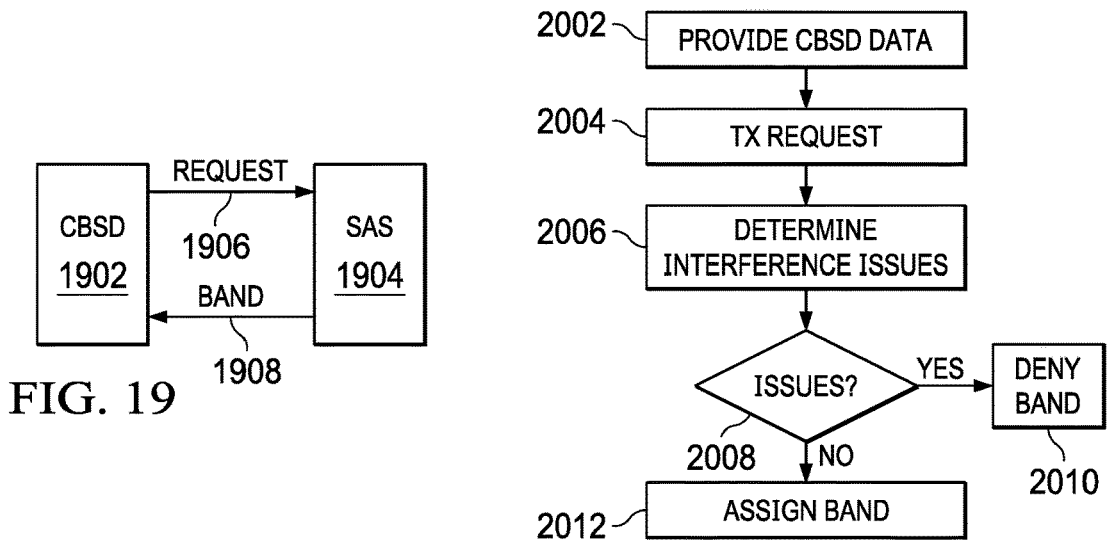
FIG. 19
FIG. 20

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

FIG. 23

SYSTEM AND METHOD FOR USING DEDICATED PAL BAND FOR CONTROL PANE AND GAA BAND AS WELL AS PARTS OF PAL BAND FOR DATA PLAN ON A CBRS NETWORK

CROSS-REFERENCE TO RELATED APPLICATIONS

This application is a Continuation-In-Part of U.S. patent application Ser. No. 15/689,769, filed on Aug. 29, 2017, and entitled USING LTE CONTROL CHANNEL TO SEND OPENFLOW MESSAGE DIRECTLY TO SMALL CELLS TO REDUCE LATENCY IN AN SDN-BASED MULTI-HOP WIRELESS BACKHAUL NETWORK. U.S. patent application Ser. No. 15/689,769 claims the benefit of U.S. Provisional Application No. 62/381,073, filed on Aug. 30, 2016, and entitled USING LTE CONTROL CHANNEL TO SEND OPENFLOW MESSAGE DIRECTLY TO SMALL CELLS TO REDUCE LATENCY IN AN SDN-BASED MULTI-HOP WIRELESS BACKHAUL NETWORK. U.S. patent application Ser. No. 15/689,769 also claims the benefit of U.S. Provisional Application No. 62/381,071, filed on Aug. 30, 2016, and entitled AN SDN-BASED CHANNEL ESTIMATION FOR MULTIPLEXING BETWEEN LOS MMWAVES, NLOS SUB-6 GHZ AND FSO. U.S. Application Nos. 15/689,769, 62/381,073 and 62/381,071 are incorporated by reference herein in their entirety.

TECHNICAL FIELD

The present invention relates to the generation of wireless links with nodes of small cell backhaul networks, and more particularly, manners for generating communication links using a communications protocol that enables software defined networking.

SUMMARY

The present invention, as disclosed and described herein, in one aspect thereof, comprises a system for providing small cell backhaul communication includes a small cell backhaul network including a plurality of small cell network nodes. A software defined network (SDN) controller controls link configuration between the plurality of small cell network nodes of the small cell backhaul network. The SDN controller communicates control channel information with the plurality of small cell network nodes over a primary access license (PAL) control channel using a citizens broadband radio services (CBRS) band that enables software defined networking.

BRIEF DESCRIPTION OF THE DRAWINGS

For a more complete understanding, reference is now made to the following description taken in conjunction with the accompanying Drawings in which:

FIG. 16 illustrates communications between an SDN controller and a small cell using OpenFlow messages over a CBRS network;

FIG. 18 illustrates various usage levels of CBRS network;

FIG. 19 illustrates the interactions between a citizens broadband service device (CBSD) and a spectrum allocation server (SAS);

FIG. 20 is a flow chart illustrating the interaction process between a CBSD and SAS;

FIG. 23 illustrates a further embodiment of the subframe structure;

DETAILED DESCRIPTION

Figure 1:
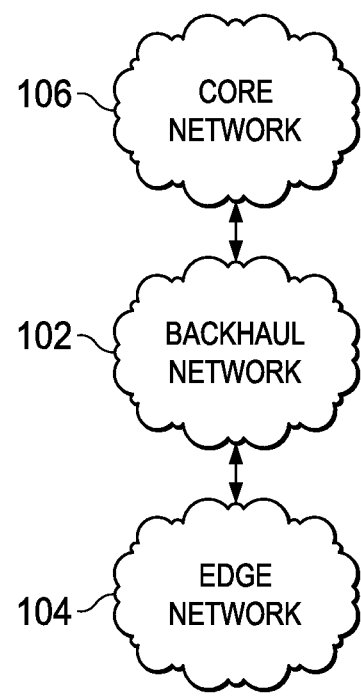
FIG. 1 illustrates the manner in which a backhaul network interconnects an edge network and a core network.

Referring now to the drawings, wherein like reference numbers are used herein to designate like elements throughout, the various views and embodiments of a system and method for using dedicated PAL band for control plane and GAA band as well as parts of PAL band for data plane on a CBRS net work are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, there is illustrated the manner in which a backhaul network 102 is used for interconnecting an edge network 104 with a core network 106. In a hierarchical network the backhaul network 102 comprises the intermediate links between the core network 106 (backbone network) and the small subnetworks at the edge of the entire hierarchical network. The backhaul network 102 carries packets/data to and from the core network 106. For example, in a telecommunications network cell phones communicating with a cell tower constitute a local subnetwork. The connection between the cell tower and the rest of the world begins with a backhaul links to the core of the Internet service provider network. Backhaul networks 102 may be used to describe the entire wired part of the network, although some networks have wireless instead of wired backhaul, in whole or in part, for example using microwave bands, mesh networks and edge network topologies. The backhaul network 102 may use high-capacity wireless channels to get packets to the microwave or fiber links.

Backhaul networks 102 may use a variety of technologies. The choice of backhaul technology must take into account parameters such as capacity, cost, reach and the need for such resources as frequency spectrum, optical fiber, wiring or rights-of-way. Generally, backhaul solutions can largely be categorized into wired (leased lines or copper/fiber) or wireless (point-to-point, point to multipoint over high-capacity radio links). Wired solutions are usually very expensive and often impossible to deploy in remote areas. This makes wireless a more suitable and/or viable option. Multi-hop wireless architecture can overcome the hurdles of wired solutions by creating efficient large coverage areas with growing demand in emerging markets where cost is often a major factor in deciding technologies. Wireless backhaul solutions are able to offer carrier grade services which are not easily feasible with wired backhaul connectivity. Backhaul technologies include free space optics, point-to-point microwave radio relay transmission (terrestrial or by satellite), point to multipoint microwave access technologies, such as LMDS, Wi-Fi, WiMAX, DSL variants such as ADSL and SHDSL, PDH and SDH Lasse Esso and ET interfaces, such as (fractional) E1/T1, E3, T3, STM-1/OC-3, etc. and ethernet. The system such as that more fully herein below may also be used within the systems such as that describe in U.S. patent application Ser. No. 14/882,085 entitled APPLICATION OF ORBITAL ANGULAR MOMENTUM TO FIBER, FSO AND RF filed on Oct. 15, 2015 which is incorporated herein by reference in its entirety to transmit information.

In an additional to the plane wave embodiments that are disclosed in the described system for SDN-based channel estimation for multiplexing between LOS mmWaves, NLOS sub-6 GHz and FSO described herein, a system for implementing the twisted waves generated by the application of orthogonal functions to a plane wave may also be utilized. For example, the various embodiments disclosed in U.S. patent application Ser. No. 15/216,474 entitled SYSTEM AND METHOD FOR COMBINING MIMO AND MODE-DIVISION MULTIPLEXING filed on Jul. 21, 2016 and U.S. patent application Ser. No. 15/144,297 entitled SYSTEM AND METHOD FOR COMMUNICATION USING ORBITAL ANGULAR MOMENTUM WITH MULTIPLE LAYER OVERLAY MODULATION filed on May 2, 2016, each of which is incorporated herein by reference in their entirety may be used.

Using the system such as that described herein with respect to an SDN-based channel estimation for multiplexing between LOS mmWaves, NLOS sub-6 GHz and FSO, the FSO, RF, sub-6 GHz, LOS, non LOS and other types of signals are multiplexed between to provide the best signal output depending upon present operating conditions.

Hybrid (Heterogeneous) networks consist of networks including devices wherein in the components providing the transmission of data are all the same but may each be configured using the included operating software to provide different types of transmissions including but not limited to point-to-point (P2P); point-to-multipoint (P2MP); multi-point-to-multipoint (MP2MP); etc.

Architecture relates to the various system layers and their application to the system from the application layer to the hardware layer such as that described in U.S. Provisional Application No. 62/371,279, filed on Aug. 5, 2016 and entitled ULTRA-BROADBAND VIRTUALIZED TELE-COM AND INTERNET, which is incorporated herein by reference in its entirety.

Multiband as used herein relates to licensed and unlicensed bands as established in FCC regulations. Licensed bands include, but are not limited to, 24 GHz, 30 GHz, 28 GHz and sub-6 GHz. Unlicensed bands include, but are not limited to, U bands(60 GHz), E bands (71-76 GHz, 81-86 GHz) and WiFi.

Topology for systems implementing the described components may configure the nodes in a tree topology or a ring topology. The tree topology comprises a number of nodes interconnected in a tree structure beginning with a single node that expands to multiple second nodes and each of the second nodes expanding to further multiple third nodes or the single node interconnected to each of the other nodes of a network. Each of the other nodes communicates through the single central node. A ring topology includes a ring connection of all nodes with each node connected only to two adjacent nodes.

A multilayer backhaul network provides for communications using each of copper wire, fiber and RF transmissions. RF may use line of sight and non-line of sight transmissions. Copper may comprise vector bundled (VDSL2) and other types of transmissions. Fiber may use GPON or other types of transmissions.

Total Cost Ownership (TCO) can be achieved by using a combination of software defined networking (SDN), network topology and healing networks to balance factors such as power consumption, capacity and reliability/quality to achieve an optimal operating point. A best operating point can be determined that use each of these three factors.

Software Defined Networks and Network Function Virtualization

Figure 2:
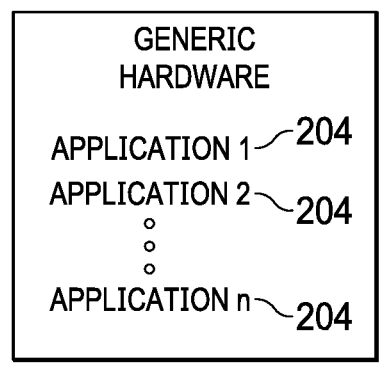
FIG. 2 illustrates a network function virtualization.

Diverse proprietary network hardware boxes increase both the capital and operational expense of service providers while causing problems of network management. Network function virtualization (NFV) addresses these issues by implementing network functions as pure software on commodity and generic hardware. Thus, as shown in FIG. 2, a generic off-the-shelf hardware 202 may be used to generate a variety of system applications 204 that are programmed into the hardware. NFV allows flexible provisioning, deployment, and centralized management of virtual network functions. Integrated with Software Defined Networks (SDN), the software-defined NFV architecture further offers agile traffic steering and joint optimization of network functions and resources. This architecture benefits a wide range of applications (e.g., service chaining) and is becoming the dominant form of NFV. Herein below, we introduce development of NFV under the software-defined NFV architecture, with an emphasis on service chaining as its application to Backhaul, Fronthaul and last mile wireless Internet Access. The software-defined NFV architecture is introduced as the state of the art of NFV and presents relationships between NFV and SDN. Finally, significant challenges and relevant solutions of NFV are described and its application domains (i.e. BH/FH/Access) are discussed.

Current network services rely on proprietary boxes and different network devices that are diverse and purpose-built. This situation induces network management problem, which prevents the operation of service additions and network upgrades (ossification). To address this issue and reduce capital expenditures (CapEx) and operating expenditures (OpEx), virtualization has emerged as an approach to decouple the software from the supported hardware and allow network services to be implemented as software. ETSI proposed Network Functions Virtualization (NFV) to virtualize the network functions that were previously carried out by some proprietary dedicated hardware. By decoupling the network functions from the proprietary hardware boxes, NFV provides flexible provisioning of software-based network functionalities on top of an optimally shared physical infrastructure. It addresses the problems of operational costs of managing and controlling these closed and proprietary boxes by leveraging low cost commodity servers.

On the other hand, with the development of Software Defined Networking (SDN), the trend is to integrate SDN with NFV to achieve various network control and management goals (i.e. dynamic resource management and intelligent service orchestration). Through NFV, SDN is able to create a virtual service environment dynamically for a specific type of service chain, consequently the dedicated hardware and complex labor work to provide a new coming service request is avoided. In conjunction with the use of SDN, NFV further enables real-time and dynamic function provisioning along with flexible traffic forwarding.

Software-defined NFV leverages network virtualization and logically centralized intelligence to minimize the service providing cost and maximize the utilization of network resources. In this case, the obtained higher resource utilization will introduce less investigation on the hardware equipment, which on the other hand simplifies networking operations. Moreover, by automating current manually intensive network configuration, provisioning, and management, the time and operational complexity are significantly reduced and manual errors are dramatically decreased, which offers better scalability. On the other hand, especially in large scale networks, deploying and providing a new kind of service usually results in a long and repeated process that requires long cycles of validation and testing. By automating the control, management and orchestration, the deployment time and operation cost will be significantly reduced.

Service chaining is the main area of software-defined NFV. In current networks, a service chain includes a set of hardware dedicated network boxes offering services such as load balancers, firewall, Deep Packet Inspection (DPI), Intrusion Detection System (IDS), etc., to support a dedicated application. When a new service requirement is added, new hardware devices must be deployed, installed and connected, which is extremely time-consuming, complex, high-cost and error-prone. This kind of networking service requires a dedicate plan of networking changes and outages, which requires high OpEx. On the other hand, the architecture of software-defined NFV is able to simplify the service chain deployment and provisioning. It enables easier and cheaper service provisioning in the local area networks, enterprise networks, data center and Internet service provider networks, wireless operator networks and their backhaul, fronthaul and last mile access networks.

The following introduces the state-of-the-art of NFV and its main challenges within the software-defined NFV architecture. Service chaining is highlighted and discussed as a core application of NFV in different contexts. Guidelines are provided for developments of NFV in various applications to backhaul, fronthaul and last mile access.

Software-Defined Network Function Virtualization

To reduce CapEx and OpEx introduced by diverse proprietary hardware boxes, NFV exploits and takes advantage of the virtualization technology. NFV allows network operators and service providers to implement network functions in software, leveraging standard servers and virtualization technologies, instead of purpose-built hardware. Recent trends of increased user information demands, explosion of traffic and diverse service requirements further drive NFV to be integrated with SDN, forming the software-defined NFV architecture. This architecture offers great flexibility, programmability and automation to the operators in service provisioning and service modeling.

Diverse and fixed proprietary boxes make the service, deployment and testing of new systems increasingly difficult. NFV is a key technology to benefit IT virtualization evolution by separating the hardware network functions from the underlying hardware boxes by transferring network functions from dedicated hardware to general software running on commercial off-the-shelf (COTS) equipment, i.e., virtual machines (VMS). These software applications are running on standard IT platforms like high-performance switches, service, and storage. Using NFV, the different network functions can be deployed in different locations of the networks such as data centers, network nodes, and end-nodes of a network edge as required. Currently, the market of NFV includes switching elements, network elements, network services and applications. A summary of these include:

Network switching elements, i.e., Broadband Network Gateway (BNG), carrier grade NAT, Broadband remote access server (BRAS), and routers.

Mobile network devices, i.e., Home Location Register/Home Subscriber Server (HLR/HSS), Serving GPRS Support NodeMobility Management Entity (SGSNMME), Gateway support node/Packet Data Network Gateway (GGSN/PDN-GW), RNC, NodeB and Evolved Node B (eNodeB) such as that disclosed in T. Wu, L. Rui, A. Xiong, and S. Guo, "An automation PCI allocation method for eNodeB and home eNodeB cell," in *Proc. IEEE 6th Int. Conf. Wireless Commun. Netw. Mobile Comput.* (*WiCOM*), September 2010, pp. 1-4, which is incorporated herein by reference in its entirety.

Virtualized home environments as described in A. Berl, H. de Meer, H. Hlavacs, and T. Treutner, "Virtualization in energy-efficient future home environments," *IEEE Commun. Mag.*, vol. 47, no. 12, pp. 62-67, December 2009 and R. Mortier et al., "Control and understanding: Owning your home net-work," in *Proc. IEEE 4th Int. Conf. Commun. Syst. Netw.* (*COMSNETS*), January 2012, pp. 1-10, each of which are incorporated herein by reference in its entirety.

Tunneling gateway devices, i.e., IPSec/SSL virtual private network gateways.

Traffic analysis elements, i.e., Deep Packet Inspection (DPI), Quality of Experience (QoE) measurement.

Service Assurance, Service Level Agreement (SLA) monitoring, Test and Diagnostics such as that described in H. Ludwig et al., "Web service level agreement (WSLA) language specification," IBM Corp., New York, N.Y., USA, Tech. Rep., 2003, pp. 815-824, which is incorporated herein by reference.

Next-Generation Networks (NGN) signaling such as Session Border Controller (SBCs), IP Multimedia Subsystem (IMS).

Application-level optimization devices, i.e., Content Delivery Network (CDNs), load balancers, cache nodes, and application accelerators such as that described in F. T. Leighton and D. M. Lewin, "Content delivery network using edge-of-network servers for providing content delivery to a set of participating content providers," U.S. Pat. No. 6,553,413, Apr. 22, 2003, which is incorporated herein by reference in its entirety.

Network security devices, i.e., Firewalls, intrusion detection systems, DOS attack detector, virus scanners, spam protection, etc. such as that described in E. D. Zwicky, S. Cooper, and D. B. Chapman, *Building Internet Firewalls*, Sebastopol, CA, USA: O'Reilly Media, 2000, which is incorporated herein by reference in its entirety.

The major advantage of using NFV is to reduce middle dedicated hardware boxes deployed in the traditional networks to take the advantages of cost savings and bring flexibility. On the other side, NFV technology also supports the co-existence of multi-tenancy of network and service functions, through allowing the usage of one physical platform for different services, applications and tenants.

NFV Framework

Figure 3:
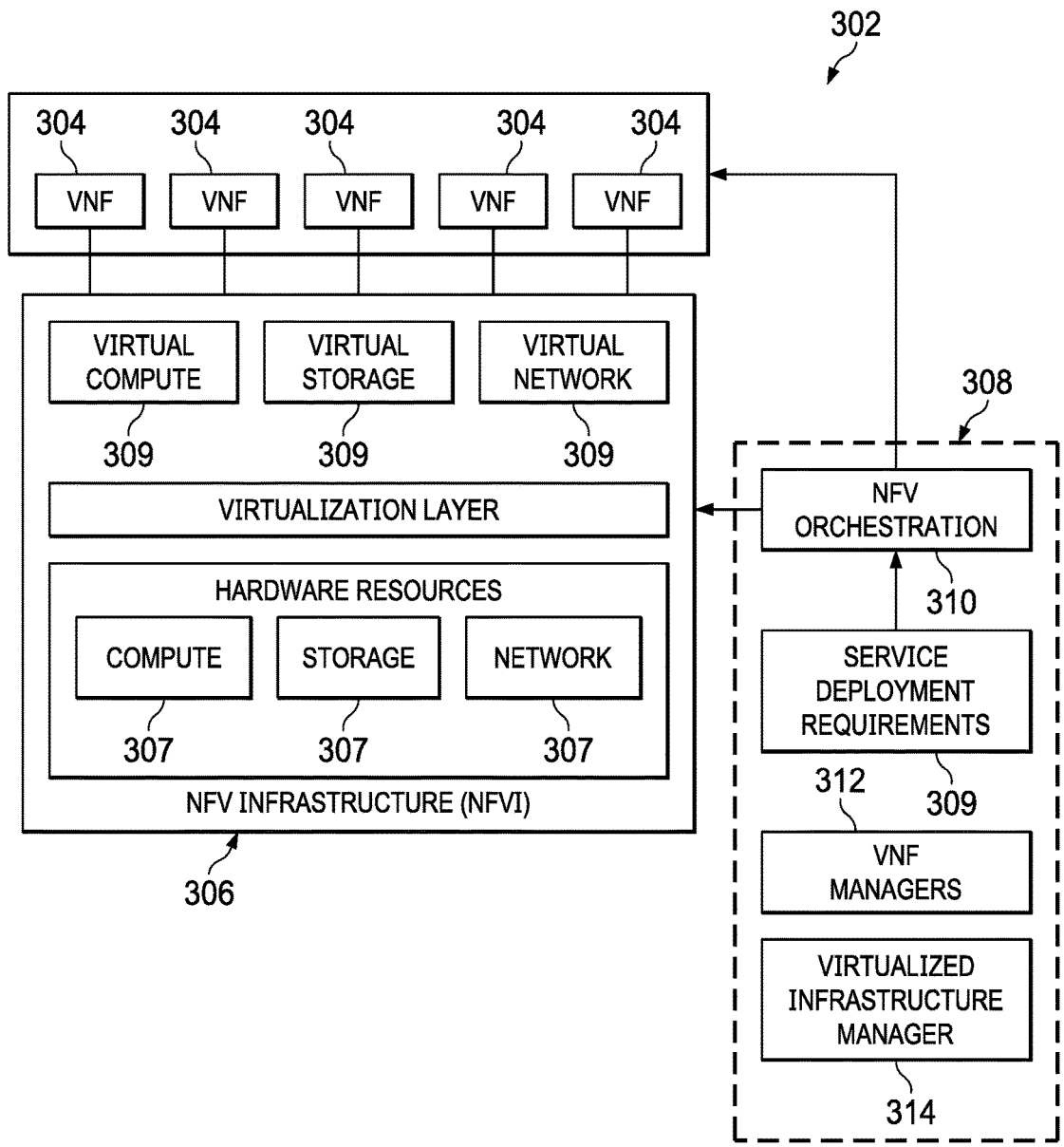
FIG. 3 illustrates a network function virtualization architectural framework.

ETSI defines the NFV architectural framework 302 as illustrated in FIG. 3 enabling virtualized network functions (VNF) 304 to be deployed and executed on a Network Functions Virtualization Infrastructure (NFVI) 306, which consists of commodity servers 307 to provide computing, storage and network functionalities wrapped with a software layer that logically partitions them. Above the hypervisor layer, a VNF 304 is typically mapped to one VM (virtual machine) 309 in the NFVI. The deployment, execution and operation of VNFs 304 on the NFVI 306 are steered by a Management and Orchestration (M&O) system 308, whose behavior is driven by a set of metadata describing the characteristics of the network services and their constituent VNFs. The M&O system includes an NFV Orchestrator 310 in charge of the lifecycle of network services, a set of VNF managers 312 in charge of the life cycle of the VNFs and a virtualized infrastructure manager 314, which can be viewed as an extended cloud management system responsible for controlling and managing NFVI resources.

Software-Defined Networks

A Software-Defined Network (SDN) is an important and recently emerging network architecture to decouple the network control from the data forwarding. With its inherent decoupling of the control plane from the data plane, SDN offers a greater control of a network through programming. This combined feature would bring potential benefits of enhanced configuration, improved performance, and encourages innovation in network architecture and operations. Especially, SDN offers a promising alternative for traffic steering by programmatically configuring forwarding rules as described in N. Handigol, S. Seetharaman, M. Flajslik, N. McKeown, and R. Johari, "Plug-n-serve: Load-balancing Web traffic using OpenFlow," in Proc. ACM SIGCOMM Demo, 2009, pp. 1-2, which is incorporated herein by reference in its entirety.

Figure 4:
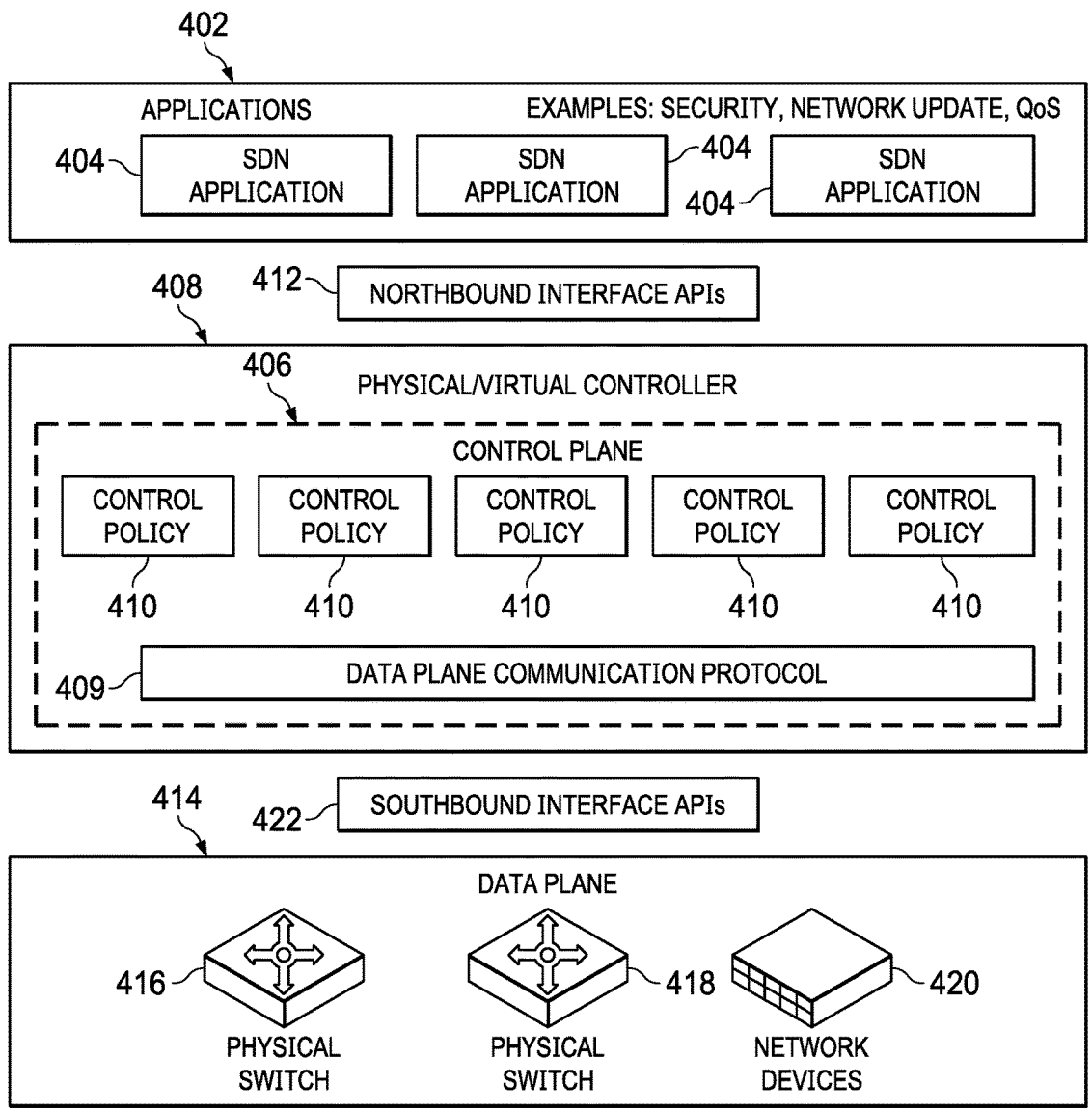
FIG. 4 illustrates software defined network architecture.

FIG. 4 depicts the SDN architecture. There are three different layers. The application layer 402 covers an array of applications 404 focusing on network services, and they are mainly software applications communicating with the control layer 406. As the core of SDN, the control layer 406 consists of a centralized controller 408, which logically maintains a global and dynamic network view, takes requests from the application layer 402, and manages the network devices via standard protocols 409 using control policies 410. Communications between the applications layer 402 and the control layer 406 occur through application program interfaces 412. The data-plane layer 414 provides infrastructure including switches, routers and network appliances through physical switches 416, virtual switches 418 and network devices 420. In an SDN context, these devices are programmable and support standard interfaces. Communications between the control layer 406 and the data plane layer 414 occur via application program interfaces 422.

The application layer 402 utilizes the northbound APIs 412 to communicate with the SDN controller 406 (Control Plane Layer), which enable different control mechanisms for the networks. The southbound APIs 422 define the communication interface between the controller layer 406 and data plane devices within the data plane layer 414, which enable the application to control the forwarding device is a flexible and programmable manner.

NFV Versus SDN

NFV and SDN are closely related and highly complementary to each other. NFV can serve SDN by virtualizing the SDN controller 406 (which can be regarded as a network function) to run on the cloud, thus allows dynamic migration of the controllers to the optimal locations. In turn, SDN serves NFV by providing programmable network connectivity between virtual network functions (VNFs) to achieve optimized traffic engineering and steering. However, NFV and SDN are completely different from the concepts to the system architecture and functions, which are summarized by the following aspects.

NFV is a concept of implementing network functions in software manner, while SDN is concept of achieving centrally controlled and programmable network architecture to provide better connectivity. NFV aims at reducing CapEx, OpEx, and space and power consumption, while SDN aims at providing network abstractions to enable flexible network control, configuration and fast innovation. NFV decouples the network functions from the proprietary hardware to achieve agile provisioning and deployment, while SDN decouples the network control plane from the data.

Software-Defined NFV Architecture

Figure 5:
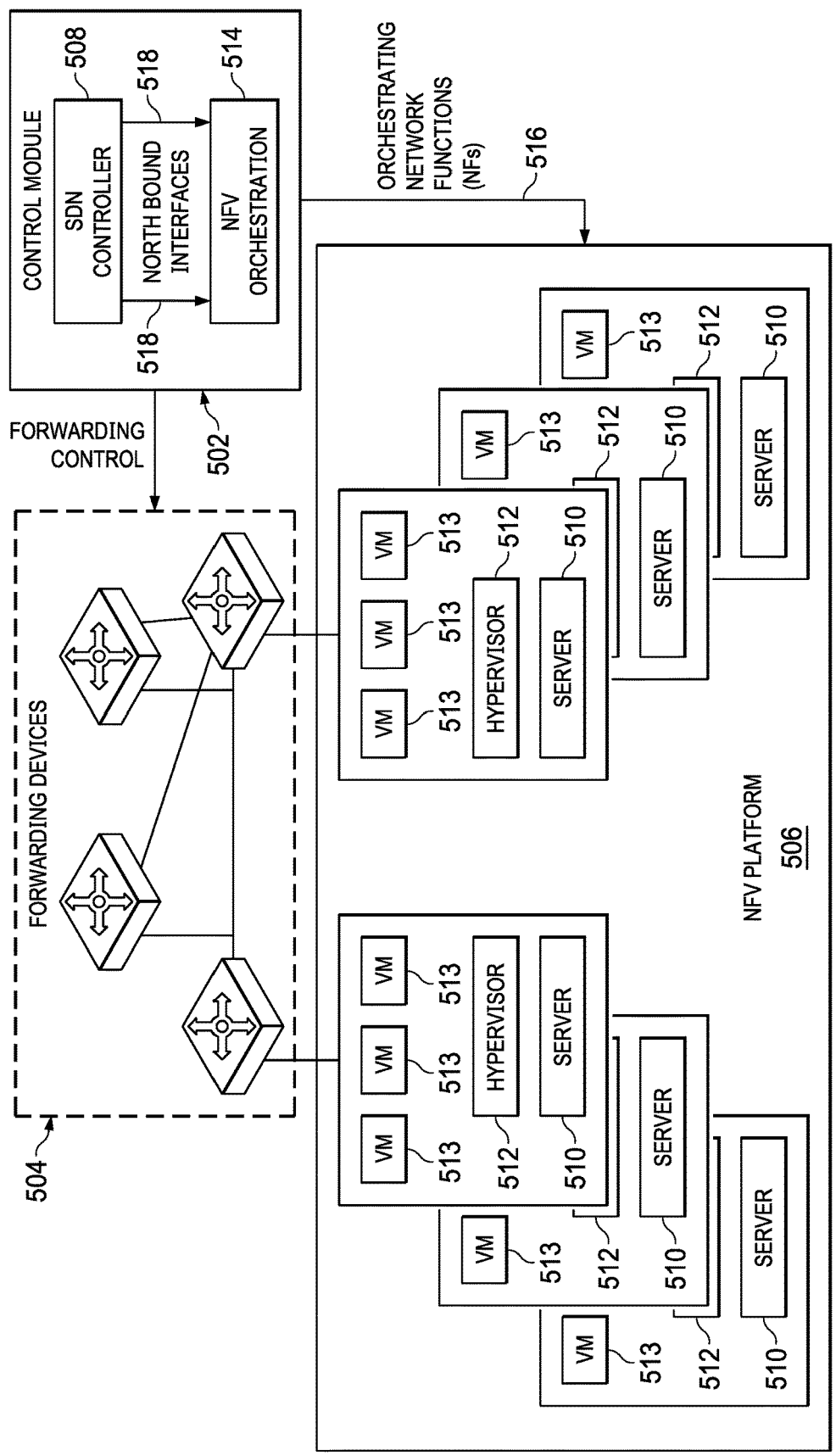
FIG. 5 illustrates a software defined network function virtualization system.

The software-defined NFV system is illustrated in FIG. 5. The system consists of a control module 502, forwarding devices 504 and NFV platform 506 at the edge of the network. The logic of packet forwarding is determined by the SDN controller 508 and is implemented in the forwarding devices 504 through forwarding tables. Efficient protocols, e.g., OpenFlow, can be utilized as standardized interfaces in communicating between the centralized controller 502 and distributed forwarding devices 504. The NFV platform 506 leverages commodity servers 510 to implement high bandwidth NFs (network functions) at low cost. Hypervisors 512 run on the servers 510 to support the VMs 513 that implement the NFs. This platform 506 allows customizable and programmable data plane processing functions such as middle box of firewalls, IDSs, proxies, which are running as software within virtual machines, where NFs are delivered to the network operator as pieces of pure software.

Figure 6:
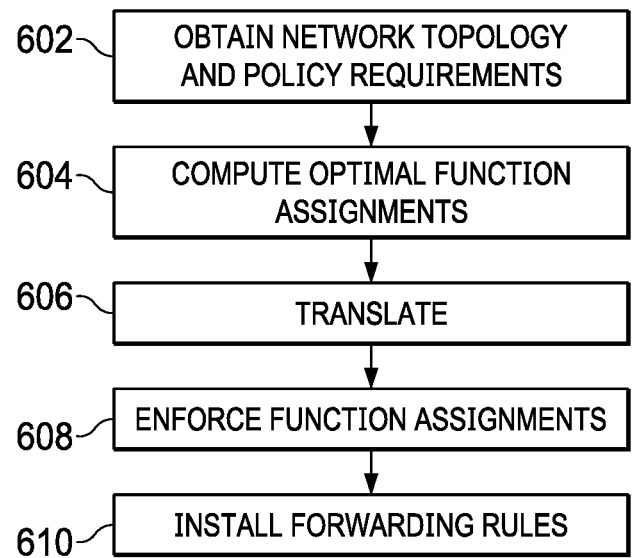
FIG. 6 illustrates a flow diagram describing a process for provisioning functions.

The SDN controller 508 and the NFV orchestration system 514 compose the logical control module 502. The NFV orchestration system 514 is in charge of provisioning for virtualized network functions 516, and is controlled by the SDN controller 508 through standard interfaces 518. Referring now to FIG. 6, there is illustrated a process for provisioning functions. After obtaining the network topology and policy requirements at step 602, the control module 508 computes the optimal function assignments (assigning network functions to certain VMs) at step 604 and translates at step 606 the logic policy specifications into optimized routing paths. The function assignments are enforced at step 608 by the NFV orchestration system 514, and the controller 508 steers the traffic traveling through the required and appropriate sequence of VMs 513 and forwarding devices 504 by installing forwarding rules into them at step 610.

From Middle Box to NFV

Though NFV is not limited to virtualizing middle boxes, the concept of NFV was initiated in the context of middle box. The present disclosure introduces the evolution from a traditional purpose-built middle box to NFV, during which consolidated middle box and software-defined middle box act as transitional paradigms.

Middlebox Overview

A middle box is a networking forwarding or processing device that transmits, transforms, filters, inspects or controls network traffic for purposes of network control and management. A middle box service or function is a method or operation performed by a network device that needs specific intelligence about the applications. Typical examples of middle boxes include network address translators (NATs) that modify packet's destination and source addresses, and firewalls that filter unwanted or malicious traffic. The following are commonly deployed middle boxes:

1) Network Address Translator (NAT)
2) Firewall (FW)
3) Intrusion Detection System (IDS)
4) Load Balancer (LB)
5) WAN Optimizer
6) Flow Monitor (FM)

Consolidated Middlebox

Here, an overview for the efforts on consolidating middle boxes is provided, which are precursors to the current NFV paradigm.

1) CoMb
2) APLOMB
3) Integrate Middle Boxes into Network

Software-Defined Middlebox

As SDN evolves, the principles of abstracting the architecture layer of network from the control plane 406 and data plane 414 have been investigated in various contexts. This idea introduces some unique opportunities for the development of middle boxes. Inspired by the idea of SDN, some researchers proposed a software-defined middle box and corresponding networking architecture, with the aim of providing fine-grained and programmable control over the middle box state and network forwarding.

Service Chaining

Service chaining is an important model for network service providers, in which NFV plays an important role. It is utilized to organize the service function deployment, where the ability of specifying an ordered list of service processing for the service's traffic flows is provided. A service chain defines the required processing or functions and the corresponding order that should be applied to the data flow. These chains require the integration of service policy and the above applications to achieve optimal resource utilization.

Traditional service chaining mainly relies on manual configuration which is tedious, error-prone and clumsy. SDN provides new capabilities to steer traffic dynamically based on user requirements. However, hardware-based middle boxes limit the benefit of SDN due to their fixed functionalities and deployment. NFV is a good enabler for SDN. With the ability of dynamic function provisioning offered by NFV and the centralized control of SDN, new opportunities emerged in service chaining. Better performance and resource utilization can be achieved with the software-defined NFV architecture.

SDN & Middle Box Based Service Chaining

SDN offers the flexible control approach and enables dynamic traffic forwarding, and this style of traffic control for middle box-specific flow can realize flexible and efficient service chaining with no need to generate any placement or introduce some constraints on middle boxes, which are on the other hand easily supported by current SDN standards. The following are some of the important functions:

1) Symple
2) Steering
3) Flowtag

Service Chaining in the Software-Defined NFV Architecture

SDN and NFV together have the potential to benefit service operators, satisfy user service level agreements and accurately monitor and control network traffic, which further reduces and minimizes the operating cost. On one hand, NFV moves network functions out of dedicated hardware boxes to the software based on general hardware platform. SDN moves control functions out of the hardware and places it in the software controller. Therefore, the service deployment and service chains can be provided and reconfigured in the controller. In this way, not only flexible and dynamic operations are allowed, the chance for operation error and events will be much smaller because the network controller has an overall view, which reduces the probability of inconsistent configurations.

Moving the required network functions into software means that deploying the service chain no longer requires acquiring a dedicated middle box. In this case, the network functions execute as the software running on virtual machines with the control of a hypervisor 512, which enable flexible computational and networking resource provisioning. Thus, since the computational capacity can be increased when required, there's no need to over-provision. On the other hand, software-defined NFV service chaining also helps the network upgrade process. For geographically distributed networks, upgrading network devices is costly. Moreover, the errors in the network updates and re-configuration can bring down the entire network. However, with the software-defined NFV, service providers are able to create new chains without radically changing hardware. Finally, service operator can utilize these service chaining techniques by themselves, instead of using third party providers. With intelligent service chaining, complexity of resource provisioning is significantly reduced. Thus, service providers can deliver services on demand without the help of third parties.

Figure 7:
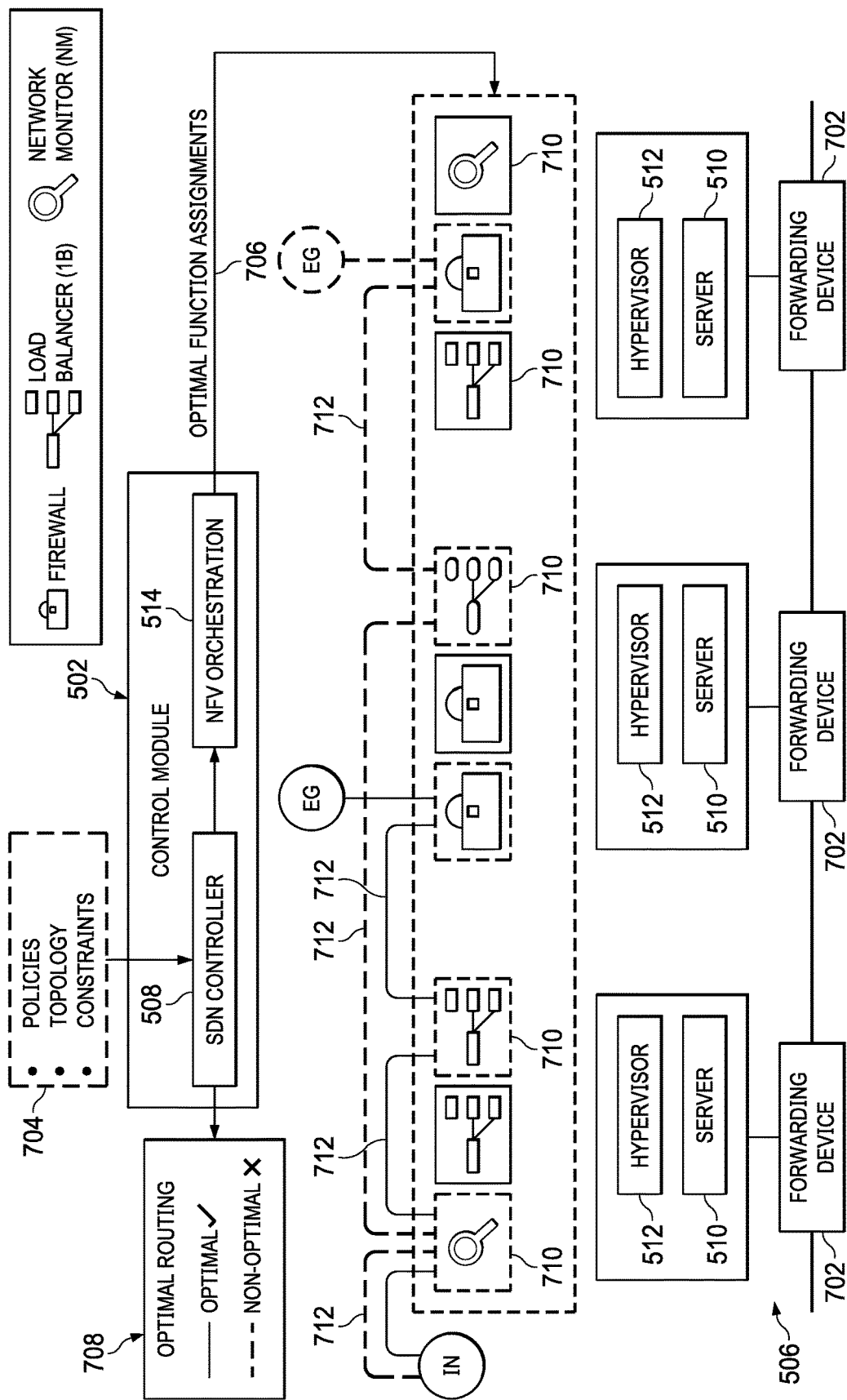
FIG. 7 illustrates an example of a service chaining process.

FIG. 7 illustrates an example of the service chaining process. Within a software-defined NFV architecture, a unified control and orchestration framework 502 is required to integrate the SDN controller 508, forwarding elements 702 and virtual network functions 573. Moreover, due to the existence of dynamic function and resource provisioning, this framework should also provide coordinated control of both network forwarding state and network functions states. Taking user policies 704 as inputs, the control module 502 assigns the NFs 706 fulfilling these services in an optimal way and meanwhile the optimal routing paths 708 of all policies are selected taking account of the resource constraints. The service functions 710 are then chained by the centralized controller and the traffic flows 712 are steered according to the service chains.

Challenges and Problems of Network Function Virtualization

NFV is an important innovation and a promising approach for the service operators and providers. However, it also faces several challenges. Here the corresponding challenges, open problems, and related solutions are summarized with the classifications organized in Table 1.

Function Virtualization

The virtualized functions should meet performance requirements to support packet processing at line-rate for multiple tenants. First, since neither the hypervisors 512 nor the virtual machines 573 have been optimized for the processing of the middle box, obtaining high performance, i.e., high I/O speed, fast packet processing, short transmission delays, etc. from standard servers is the main challenge for function virtualization. Further, as a server may implement a large amount of functionality, their platforms should host a wide range of virtual machine 513 and software packages. Finally, NFV hardware and software platforms should support multi-tenancy, because they are concurrently run by software belonging to the different operators. These co-located VNFs 304 should be isolated not only from a security but also a performance point of view. Here is a summary of some important related works on function virtualization.

1) DPDK is a set of libraries and drivers for fast packet processing for the network functions. DPDK can be run on a wide range of processors. However, the DPDK system has some limitation to support virtualization as it cannot support flexible, high performance functionality in the NFV environment.
2) NetVM is a software platform for running diversity network functionality at line-speed based on the general commodity hardware. It takes advantage of DPDK's high throughput packet processing capabilities, and further enables flexible traffic steering and overcomes the performance limitations of hardware switching. Thus, NetVM provides the capability to support network function chains by flexible, high-performance network elements.
3) ClickOS is a high-performance, virtualized software network function platform. It provides small, quickly booting, and little delay virtual machines, and over one hundred of them can be concurrently run while guaranteeing performance on a general commodity server. To achieve high performance, ClickOS relies an extensive overhaul of Xen's I/O subsystem to speed up the networking process in middle boxes. ClickOS is proof that software solutions alone are enough to significantly speed up virtual machine processing, to the point where the remaining overheads are dwarfed by the ability to safely consolidate heterogeneous middle box processing onto the same hardware.

Portability

The NFV framework is expected to support the loading, executing and moving of VNFs 304 across different but standard servers in multi-vendor environments. This capability is known as portability. These virtualized network functions defeat the portability goal and key benefits of NFV, namely the capability of multi-tenancy and resource isolation. The portability challenge is how to achieve high performance leveraging hardware accelerators and at the same time have hardware independent NFs. This approach ensures that the VNFs 304 are OS-independent and resource isolation is also guaranteed since the VNFs 304 are executed on independent VMs and are decoupled from the underlying OS by the hypervisorlayer.

Standard Interfaces

NFV relies on existing infrastructure to touch the customer. In this case, it is also highly unlikely that an upgrade of the physical network or entire operational support systems will be feasible. This is a management software integration challenge with the interfaces between NFV and underlying infrastructure. On the other hand, the interfaces between the centralized controller and VNFs 304 should also be standardized. To smoothly bridge NFV with upper and lower layers, the VNFs 304 and the underlying computing platform should be described by standard templates that enable flexible control and management. Thus, north- and south-bound interface APIs 412, 422 need to be developed. North-bound interface 412 interactions are used to control and manage functions to different types of instances, e.g., physical servers, VM 513 and VNFs 304. Since network functions need service-oriented APIs to be controlled directly or indirectly, each network service has a specific operation policy and SLA. Moreover, VNFs 304 could use the north-bound API 412 for the requests. On the other hand, the south-bound APIs 422 are utilized to communicate with the NFVI 306 and request information from other framework entities. Thus, how to design a flexible and efficient API for both the north-bound and south-bound communications are important problems in the research and development of NFV technologies.

Function Deployment

Fine-grained deployment, control and management of network functions are needed in the context of NFV-enabled network nodes, for various optimization purposes. Thus, many challenges are related to algorithm and system design of function deployment.

One of these challenges is to automatically provide network and function process resources according to the usage of the resources involved. A similar and probably even more important challenge is to achieve automatic placement and allocation of the VNFs 304, since the placement and assignment of the VNFs 304 significantly impact the performance of service chaining. Both automated provisioning and placement require a global view of the resources and a unified control and optimization system with various optimization engines running in it. Another issue is to translate higher-level policies, which are generated from the resource allocation and optimization mechanisms, into lower level configurations. Templates and standards should be developed to guarantee automated and consistent translation. For example, when there is a need to achieve a high-level goal of reducing the networking transmission delay, the optimization engine may require an algorithm to provision and place virtual functions ensuring that the least overall transmission delay is achieved. Conversely, when it is required to achieve the minimum or maximum link utilization, it would need a different optimization engine with a different algorithm. For more effective operation and control, the optimization approach should support real-time swap to make provisioning and placements that dynamically match the high-level policies from the operator and application.

Traffic Steering

SDN offers the new agility of traffic steering by allowing the network operators and service providers to specify a logical control policy, and then automatically translates this into data plane 414 forwarding rules. Prior to this, the routing paths are carefully selected by the optimization framework taking into account the physical topology, link capacities, and network resource constraints. Solid work has been done on traffic steering in hardware based middle box systems. However, in the software-defined NFV architecture, traffic steering is jointly optimized with NFV deployment that can achieve better composition. However, the unified optimization paradigm also makes the optimization problem difficult to solve since more variables are introduced. To achieve online computing of traffic steering, heuristic algorithms should be designed to reduce the computing complexity.

application traffic management policies and application delivery constraints at the required level of granularity.

NFV allows service providers to provide better services to the users by dynamically changing their deployment topologies or traffic allocations based on user access patterns, user consumption and mobility, infrastructure load characteristics, infrastructure failures and many such situations that may cause service degradation, disruption or churn. Similarly, replicated service instances might need to be moved/instantiated/released to mask infrastructure failures, load conditions, or optimize the deployment based on consumption patterns and social interaction graphs. NFV can also provide intelligent infrastructure support for such dynamic service deployment scenarios. Moreover, since NFV offers good support for multi-tenant usage, it is available for wide area dynamic multi-cloud environments that can be shared by multiple providers to implement their specific distributed service delivery contexts.

TABLE 1

| Challenges | Description | Solution |
| --- | --- | --- |
| Function Virtualization | Virtualized functions should meet certain requirements to support packet processing at line-rate:<br>(1) High performance (high I/O speed, fast packet processing, short transmission delays, etc.)<br>(2) Support multi-tenancy<br>(3) OS-independent | Important related works:<br>(1) DPDK, a set of libraries for fast packet processing.<br>(2) NetVM, a system for running network functionality and middlebox at line-speed in general commodity hardware.<br>(3) ClickOS, a small, quick-boot, low-delay, virtualized software middlebox platform. |
| Portability | The NFV framework is expected to load, execute and move VNFs across different but standard servers in multi-vendor environments. This capability is known as portability. | Deploying network functions via a virtual software environment enhances the portability. This approach ensures that the VNFs are OS-independent and resource isolation is also guaranteed. |
| Standard Interfaces | Standardized API should be developed to enable NFV to reach the customers via underlying infrastructure and to be centrally controlled and managed. | Both VNFs and computing resources are described via standard templates. Normalized north- and south-bound should be developed between these layers. |
| Function Deployment | Fine-grained deployment, control and management of network functions, are needed in the context of NFV-enabled network nodes, for various optimization purposes. | A monitoring system collecting and reporting on the behavior of the resources, and a unified control and optimization system with various optimization engines should be developed. |
| Traffic Steering | In the software-defined NFV architecture, traffic steering should be jointly optimized with function deployment, making the optimization problem difficult to solve. | To achieve online computing of traffic steering, heuristic algorithms should be designed to reduce the computing complexity. |

Applications

Software-defined NFV technology is used for delivering significant benefits in niche applications today, while its full scale use and benefits have yet to be achieved. The following describes the major domains that will dominate the software-defined NFV scenario over next few years.

Cloud-Computing

Cloud computing enables globally distributed services and enterprises to quickly deploy, manage and optimize their computing infrastructure dynamically. Partitioning or replicating a service across multiple globally distributed instances allow these services to move closer to the users thus providing richer user experiences, avoid infrastructure bottlenecks, and implement fault tolerance.

NFV is an enabler of such dynamic service provisioning. By replacing service elements with virtual network functions, new functions can be added or improved by updating a software image, rather than waiting for a vendor to develop and manufacture a dedicated box. Furthermore, while integrated with SDN, service providers can express and enforce Below are summarized some important works trying to implement NFV in clouds:

1) CloudNFV

2) THE REALTIME CLOUD

3) CLOUDBAND

Mobile Network

NFV considers all network functions for virtualization through well-defined standards, i.e., in mobile network, NFV targets at virtualizing mobile core network and the mobile-network base station. NFV also benefits data centers owned by mobile service providers, including mobile core network, access networks and mobile cloud networks.

For the core networks, which are the most important part of mobile networks, NFV allows the cellular providers to adopt a network more akin to the data centers, which consist of simple forwarding devices 504, with most functionality executed in commodity servers that are close to the base stations. Some network functions can even be fulfilled by packet-processing rules installed directly in the switches. In the system, a logically centralized controller is able to steer the network traffic through the required network functions to realize service chaining.

For the access networks, the base stations are being virtualized as well. Thus, SDN and NFV are applied to the wireless access networks to sharing their remote basestation infrastructure to achieve better coverage and services with the minimum investment of CapEx and OpEx.

Enterprise Network

NFV is also being utilized in the enterprise network. Network managers would like to consume as much or as little of the network as they need, but there is a gap between what enterprise customers want and what service providers can offer today, which can be address by NFV. It enables the dynamic provisioning of virtual network services on commodity servers within minutes instead of months.

NFV for the enterprise will require their platform to become more comfortable embracing software L4-7 services, as well as changes in their operation models. An understanding of how to optimize performance with DPDKs, and potentially even looking at programmable hardware is critical. Another challenge is the time and process it takes to re-architect monolithic services that were predominantly deployed for north-south traffic.

A comprehensive overview of NFV within the software-defined NFV architecture is provided. NFV and its relationship with SDN has been introduced. The evolution of NFV has been reviewed and the discussion has covered how middle boxes evolved to virtual network functions. In particular, service chaining as a typical application of NFV has been described. Furthermore, software defined NFV challenges and possible solutions were covered. Next, a discussion of how to take the SDN and NFV concepts and leverage them in planning, designing and implementing a wireless backhaul, fronthaul and last mile access networks using standard based protocols as well as open source protocols will be provided.

Figure 8:
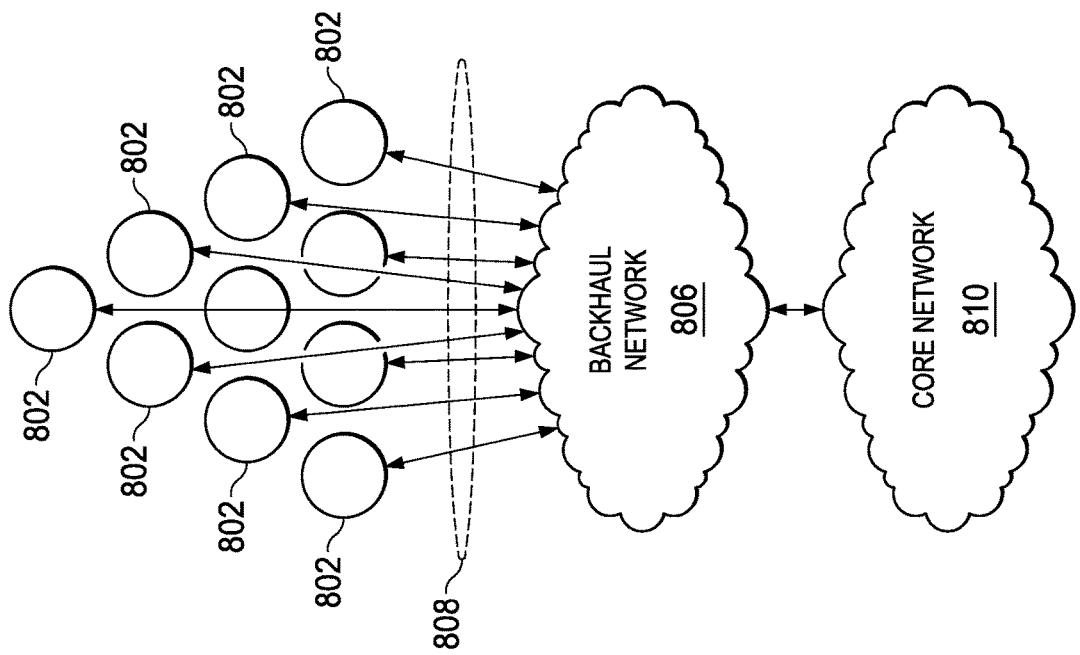
FIG. 8 illustrates a wired backhaul network.

Access and backhaul networks need to carry significantly more data in order to support ever growing data use within networks which calls for network densification. However, as illustrated in FIG. 8, when many small cells 802 are densely deployed within a small cell network 804, the backhaul network 806 may become a bottleneck due to the issues with providing a wireline link 808 between each cell 802 in the backhaul network 806 due to the large number of wireline connections within a network. The backhaul network 806 then further provides interconnection to the core network 810 for passing messages to and from the small cell network 804.

Figure 9:
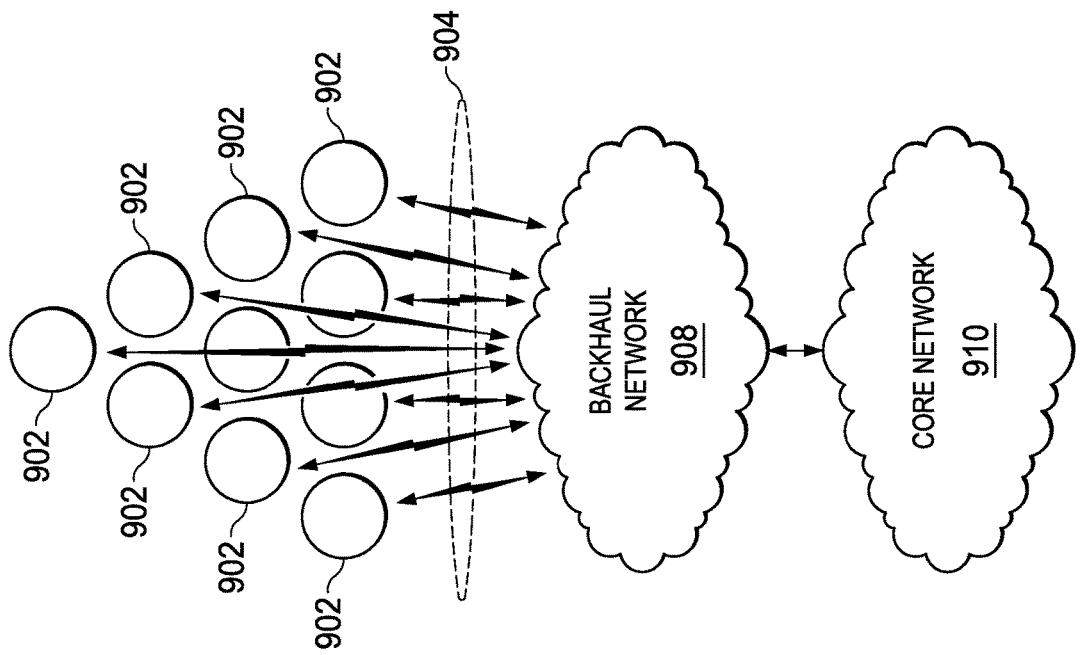
FIG. 9 illustrates a wireless backhaul network.

Referring now to FIG. 9, there is illustrated an implementation of a wireless small cell network 902. The small cell wireless backhaul network 902 is needed due to its multi-hop operation and ability to operate in multiple bands (mmWave bands, Sub 6 GHz bands, CBRS bands and free space optical (FSO) bands. Each node will include transceiver circuitry enabling transmissions on the node to node links using one or more of the mmWave bands, Sub 6 GHz bands, CBRS bands or free space optical (FSO) bands. The small cell network 902 provides a plurality of wireless connections 904 between the cells 906 and the backhaul network 908. The backhaul network 908 then forwards messages received on the wireless communications links 904 to/from the core network 910.

Figure 10:
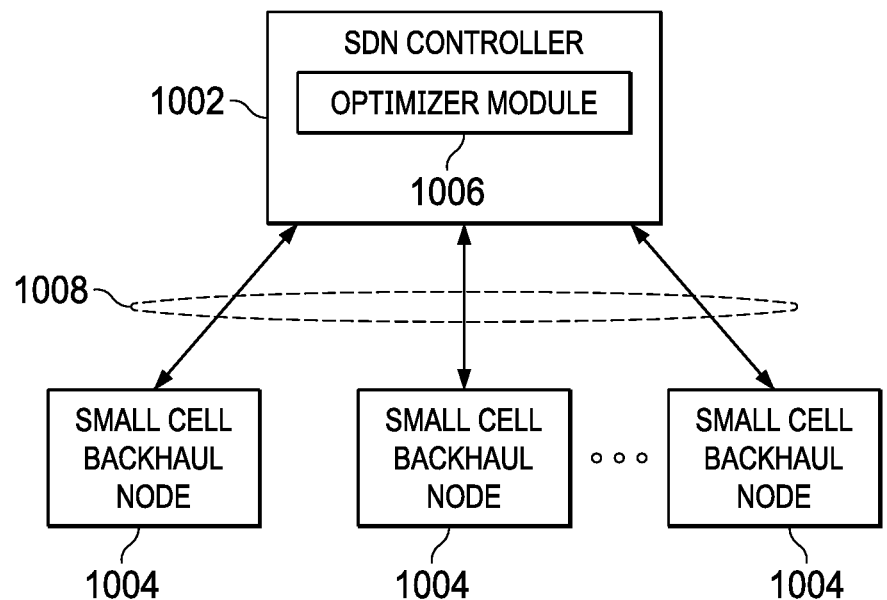
FIG. 10 illustrates a manner for using an SDN-based system for creating connections with the small cell network.

Referring now also to FIG. 10, there is illustrated the manner to utilize an SDN-based system for creating the connections with the small cell network 902. An SDN controller 1002 enables connections to a number of different small cell backhaul nodes 1004. The SDN controller 902 is based on OpenDaylight and controls adaptively powering on/off small cells 1004 and reconfigures the backhaul forwarding topology according to traffic demands. OpenDaylight is a collaborative open source project hosted by the Linux foundation. OpenDaylight promotes software defined networking (SDN) and network function virtualization (NFV). OpenDaylight software is written in the Java programming language. OpenDaylight supports technologies such as OpenFlow. OpenDaylight is a modular open platform for customizing and automating networks of any size and scale. OpenDaylight is driven by a global, collaborative community of vendor and user organizations.

The core of the OpenDaylight platform is the Model-Driven Service Abstraction Layer (MD-SAL). In OpenDaylight, underlying network devices and network applications are all represented as objects, or models, whose interactions are processed within the SAL. The SAL is a data exchange and adaptation mechanism between data models representing network devices and applications. The data models provide generalized descriptions of a device or application's capabilities without requiring either to know the specific implementation details of the other. Within the SAL, models are simply defined by their respective roles in a given interaction.

The OpenDaylight platform is designed to allow downstream users and solution providers maximum flexibility in building a controller to fit their needs. The modular design of the OpenDaylight platform allows anyone in the OpenDaylight ecosystem to leverage services created by others; to write and incorporate their own; and to share their work with others. OpenDaylight includes support for the broadest set of protocols in any SDN platform—OpenFlow, OVSDB, NETCONF, BGP and many more—that improve programmability of modern networks and solve a range of user needs.

The SDN controller 902 uses an optimizer module 1006 that is configured with different policies in order to minimize the power and latency and maximize system capacity. The optimizer module 1006 uses SDN for the operation and management of small cell wireless networks to extend the OpenFlow protocol in order to gather wireless and power consumption statistics, which are exchange between the controller 1002 and small cell backhaul nodes 1004 using and an LTE out of band control channel 1008. OpenFlow is a communication protocol that provides access to the forwarding plane of the network switch or router over the network. OpenFlow enables network controllers to determine the path of network packets across a network of switches. The controllers are distinct from the switches. The separation of the controller from the forwarding allows for more sophisticated traffic management than is feasible using access control lists and routing protocols. Also, OpenFlow allow switches from different vendors to be managed remotely using a single, open protocol. OpenFlow is an enabler of software defined networking.

OpenFlow allows for the remote administration of a layer 3 switch's packet forwarding tables, by adding, modifying and removing packet matching roles in action. Routing decisions can be made periodically or ad hoc by the controller and translated into rules and actions with a configurable lifespan, which are deployed to a switch's flow table, leaving the actual forwarding of matched packets to the switch at wire speed for the duration of those rules. Packets which are unmatched by the switch can be forwarded to the controller. The controller decides to modify existing flow table rules on one or more switches or to deploy new rules, to prevent a structural flow of traffic between switch and controller. It could even be decided to forward the traffic itself, provided that it is told the switch to forward entire packets instead of just the header. The OpenFlow protocol is layered on top of the transmission control protocol and proscribes the use of transport layer security.

Figure 11:
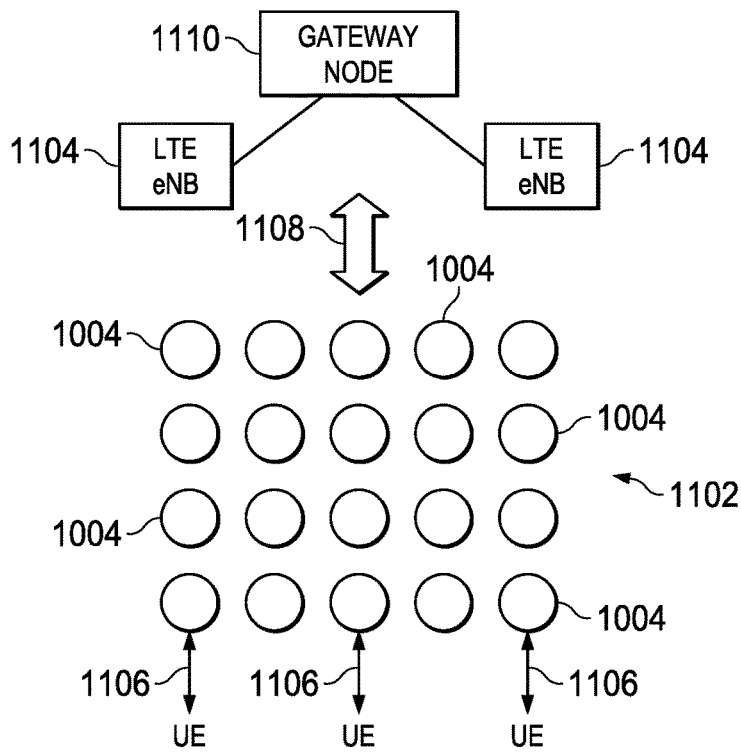
FIG. 11 illustrates a heterogeneous network.

Referring now to FIG. 11, there is illustrated a heterogeneous network (HetNet) 1102. In a HetNet, a dense small cell network 1102 comprised of a number of small cell nodes 1004 that coexist with an overlay of LTE eNBs 1104 providing the basic coverage. In such a deployment, traffic from user equipments (UE) 1106 are forwarded from the small cell node 1104 over multiple wireless backhaul links 1108 to a gateway node 1110, which is typically co-located at the eNBs 1104. Thus, in a multi-hop deployment, routing and forwarding are crucial aspects to consider, since they have to dynamically power on and off nodes 1004, according to traffic demand changes creating a liquid wireless backhaul were network resources are used where they are needed. Multi-hop deployment is used for routing and forwarding of the data plan over a multiband (mmWave, sub 6 GHz and FSO) network.

With software defined networking (SDN), packet forwarding can be handled by a centralized controller 1002 (FIG. 10), in a flexible and effective way. Adding device configuration capabilities for this kind of architecture allows small cell wireless networks to be fully managed. In a typical SDN-based architecture, the SDN controller 1002 sends OpenFlow messages that must be routed over the wireless links 1008 towards the 1004. This can lead to potentially long latency.

Figure 12:
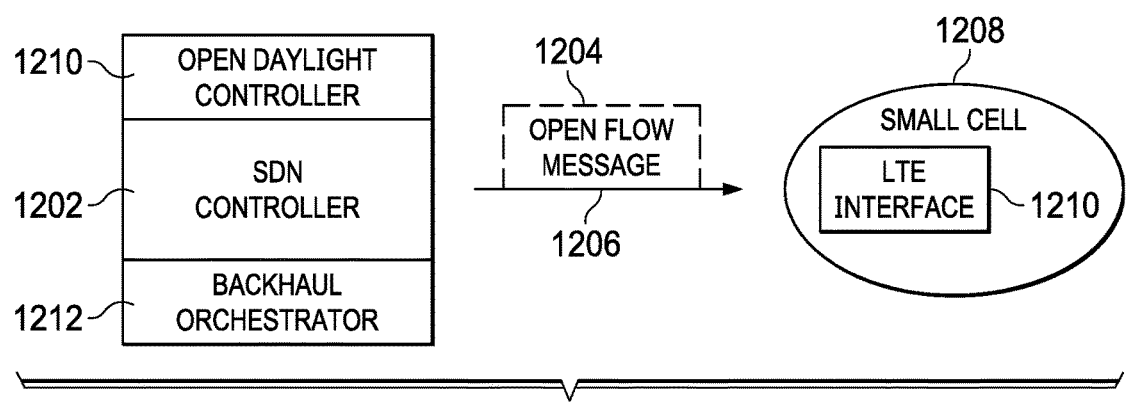
FIG. 12 illustrates communications between an SDN controller and a small cell using OpenFlow messages.

An SDN-based network architecture for small cell backhaul operation and management is proposed for dealing with these latency issues. Referring now to FIG. 12, based on the HetNets concept, the proposed SDN controller 1202 transmits an OpenFlow messages 1204 via LTE control channels 1206 directly to small cell nodes 1208. Extensions to the OpenDaylight (ODL) controller 1210 provide the necessary resilient routing infrastructure for a small cell backhaul operation. A backhaul orchestrator 1212 dynamically optimizes the small cell backhaul by minimizing power and latency while maximizing the capacity of the backhaul network.

Figure 13:
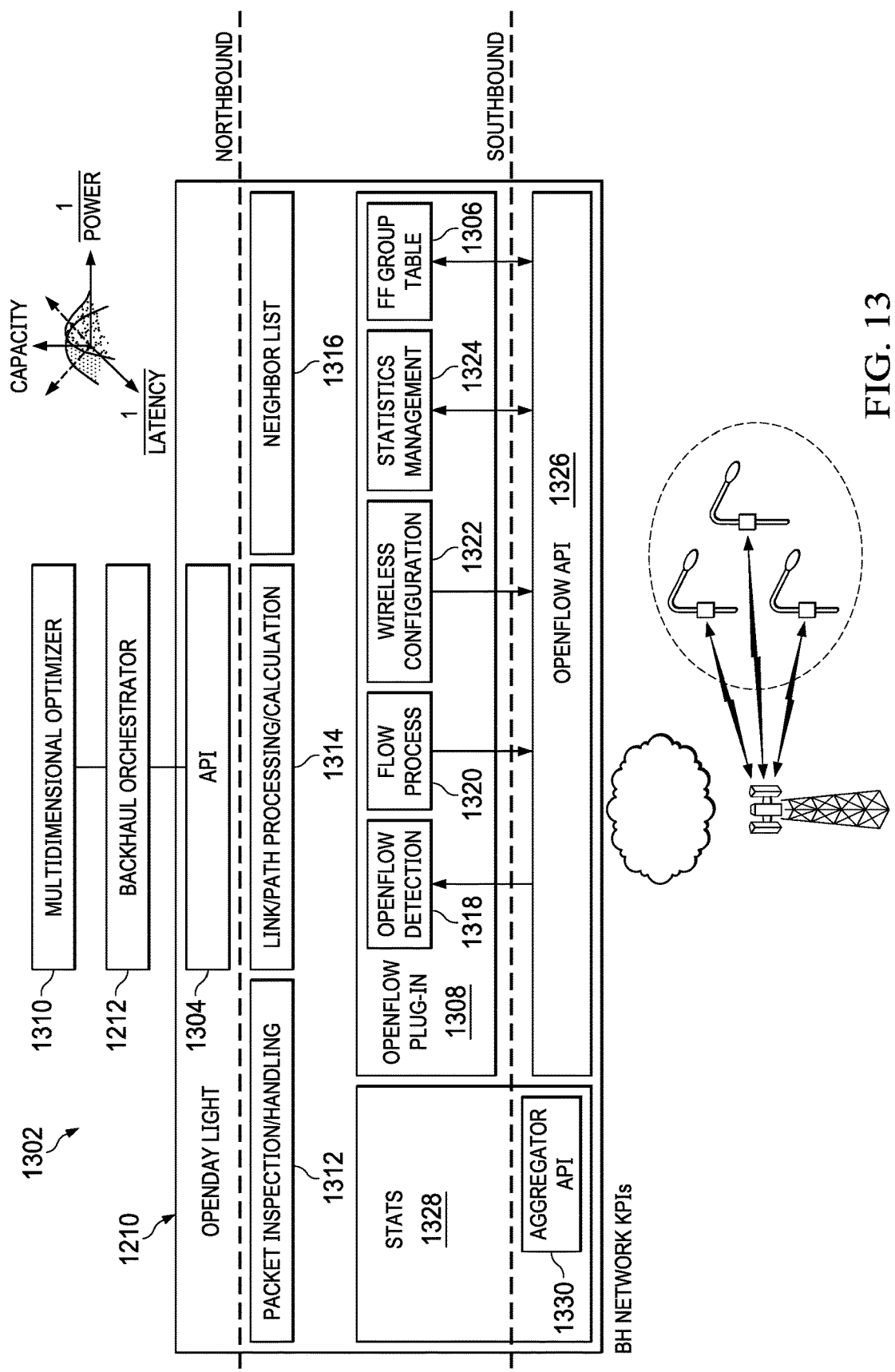
FIG. 13 illustrates a block diagram of a Backhaul Network Key Performance Indicator.

Referring now also to FIG. 13, there is illustrated a more detailed description of a backhaul network KPI (key performance indicator) 1302. The backhaul network KPI 1302 is implemented within the SDN controller 1202 to enable communications between the SDN controller and small cells within the small cell backhaul network. The small cell backhaul network include a plurality of nodes each including transceivers enabling the establishment of communications links with nodes in the network as well as the SDN controller 1202. As mentioned previously, the OpenDaylight controller 1210 provides routing infrastructure for the small cell backhaul operation. The OpenDaylight controller 1210 utilizes an application program interface 1304 for enabling communications between the controller 1210 and a backhaul orchestrator 1212. The backhaul orchestrator 1212 dynamically optimizes the small cell backhaul by minimizing power and latency while maximizing the capacity of the backhaul network. The backhaul network KPI 1302 must maintain a communication channel 1206 with the SDN controller 1304 in order to be able to exchange control plane messages with the small cell nodes 1208. This communication channel 1206 can be established in the same network interface as the one used for the data plane (in-band connectivity) or in a different interface (out-of-band). With in-band connectivity, the infrastructure costs are reduced, but if link failure occurs, the node loses the connection with the controller 1210. Out-of-band control plane connectivity requires an additional NIC (network interface controller) in the managed devices. An LTE interface 1210 is used on each SDN enabled small cell backhaul node 1310 for SDN control plane connectivity, in order to provide a robust channel and reduce SDN control latency while the data plane is using the multi-hop backhaul connectivity over a multiband (mmWave, sub 6 GHz and FSO) network.

Small cell wireless backhaul links may have dynamic link outages, especially when operating at mmWave band. A link can temporarily go from non-line of sight to outage (e.g. due to blockage), leading to changes in the backhaul topology and consequently, in the available capacity. When such events happen, the SDN controller 1202 can perform path recalculation between the backhaul small cell nodes 1208 but the process may take a significant amount of time. The backhaul network KPI 1302 as illustrated in FIG. 13 uses fast failover (FF) group tables 1306 from the OpenFlow plug-in 1308 to rapidly repair link failures locally.

The backhaul orchestrator 1212 communicates with the multidimensional optimizer 1310. The Orchestrator Interface 1304 is used to communicate with the backhaul orchestrator 1212 in order to perform the reconfiguration of the small cell backhaul network and the configuration of transceivers at the nodes. Also, this configuration can be triggered by the backhaul orchestrator 1212 through this REST API. The new configurations are pushed to the wireless communications services (WCS) and new paths are requested to the Path Calculator. The multidimensional optimizer 1310 finds a maximum value based upon latency, capacity and 1/power using Euler-Lagrange multipliers. The backhaul network KPI 1302 further includes a packet inspection/handling module 1312. The packet inspection/handling module 1312 inspects and controls the data packets that are transmitted over the communications channels 1203 to the small cell nodes 1208. The packet inspection/handling module 1312 parses packets sent to the SDN controller 1202 (e.g. for new flows when no rules are installed at the small cell backhaul nodes 1208). The extracted information is sent to the path calculator 1314, which replies with a primary path from the source to the destination node according to a given path calculation strategy. The original packet is then sent back to the destination node.

The path calculator 1314 is responsible for calculating alternate paths to the small cell nodes 1208 when existing links fail. The path calculator 1314 computes paths between the powered on small cell backhaul nodes 1208 and instructs the installation of new forwarding rules. The path calculator 1314 uses a network graph that contains only the active nodes. If the fast failover (FF) strategy is active, a maximum disjoint path is also calculated from each intermediate node, and the required forwarding rules are installed in combination with the usage of the FF group table 1306 feature from OpenFlow. The link/path processing calculation module 1314 uses information from the neighbor list 1316 to make the new path calculations. The neighborhood mapper 1316 is a database list of small cell nodes and their associated neighboring nodes. The neighborhood mapper 1316 infers the neighborhood and interference graph for each node/link from the existing topology. Small cell backhaul nodes 1208 send out periodic beacons to neighbors. The collected information statistics are sent to the SDN controller 1202 and used to augment existing data from the backhaul links The OpenFlow plug-in 1308 includes an OpenFlow detection module 1318 for detecting OpenFlow messages. The flow process module 1320 calculates the message routing. The wireless configuration service 1322 sends wireless specific configuration requests to the managed small cell backhaul nodes 1208 through an OpenFlow protocol extension. The Wireless Statistics Manager 1328 collects wireless related statistics from the managed small cell backhaul nodes 1208 over an aggregator API 1330 through an extension of the statistics manager component 1324 from the OpenFlow Plugin 1308. The statistical information is fed to the statistics module 1324 from the small cell nodes 1208. The requests and statistics can have different types, which are specified by a bit mask field in the request body. Each of the modules within the OpenFlow plugin 1308 communicates with the small cell nodes 1208 through an OpenFlow API 1326. A metrics collector 1328 is responsible for obtaining network performance metrics that cannot be directly retrieved through OpenFlow plug-in 1308. The metrics are obtained through the aggregator API 1330. The calculated data is merged into the available statistics and can be used by every other SDN controller 1202 component.

Figure 14:
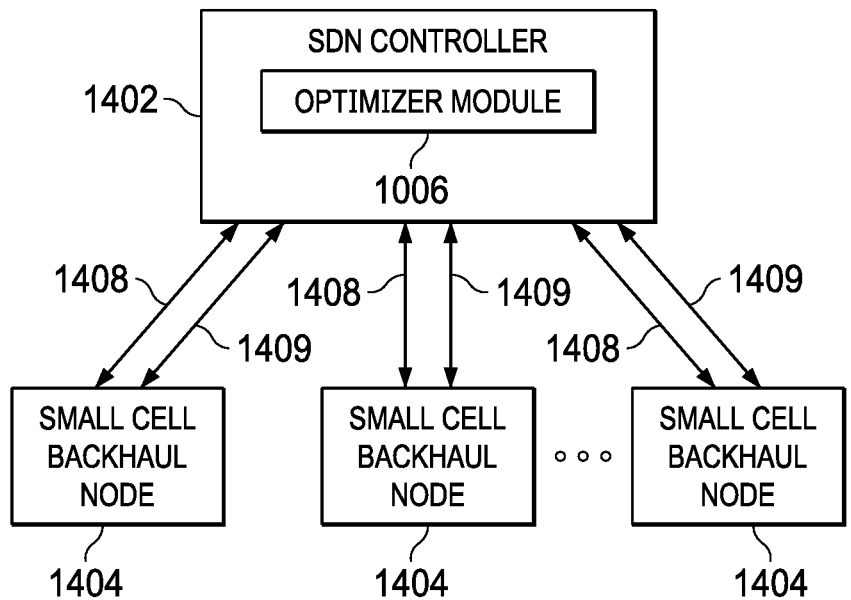
FIG. 14 illustrates an alternative embodiment of an SDN based system for providing connections with a small cell network using a citizens broadband radio services network (CBRS)

Referring now also to FIG. 14, there is illustrated an alternative embodiment wherein an SDN-based system for creating the connections with the small cell network 902 using a citizen's broadband radio services (CBRS) network. CBRS prizes the 3.5 GHz frequency band which consists of 150 MHz of spectrum from 3.55 GHz to 3.7 GHz. It is a lightly used spectrum that the U.S. Navy uses for SDN-43 non-combat, aircraft carrier landing radar. CBRS provides 1.6 MHz of usable bandwidth and conducts 1 MW of RF power. CBRS also provides 1.6 GW of EIRP (Equivalent Isotopically Radiated Power). EIRP is the product of transmitted power and the antenna gain in a given direction relative to an isotopic antenna of a radio transmitter. CBRS is utilized within the satellite industry for the receiver only and four wireless ISPs (WISP).

An SDN controller 1402 enables connections to a number of different small cell backhaul nodes 1404. The SDN controller 1402 is based on OpenDaylight and controls adaptively powering on/off small cells 1404 and reconfigures the backhaul forwarding topology according to traffic demands. OpenDaylight is a collaborative open source project hosted by the Linux foundation. OpenDaylight promotes software defined networking (SDN) and network function virtualization (NFV). OpenDaylight software is written in the Java programming language. OpenDaylight supports technologies such as OpenFlow. OpenDaylight is a modular open platform for customizing and automating networks of any size and scale. OpenDaylight is driven by a global, collaborative community of vendor and user organizations.

The core of the OpenDaylight platform is the Model-Driven Service Abstraction Layer (MD-SAL). In OpenDaylight, underlying network devices and network applications are all represented as objects, or models, whose interactions are processed within the SAL. The SAL is a data exchange and adaptation mechanism between data models representing network devices and applications. The data models provide generalized descriptions of a device or application's capabilities without requiring either to know the specific implementation details of the other. Within the SAL, models are simply defined by their respective roles in a given interaction.

The OpenDaylight platform is designed to allow downstream users and solution providers maximum flexibility in building a controller to fit their needs. The modular design of the OpenDaylight platform allows anyone in the OpenDaylight ecosystem to leverage services created by others; to write and incorporate their own; and to share their work with others. OpenDaylight includes support for the broadest set of protocols in any SDN platform—OpenFlow, OVSDB, NETCONF, BGP and many more—that improve programmability of modern networks and solve a range of user needs.

The SDN controller 1402 uses an optimizer module 1406 that is configured with different policies in order to minimize the power and latency and maximize system capacity. The optimizer module 1406 uses SDN for the operation and management of small cell wireless networks to extend the OpenFlow protocol in order to gather wireless and power consumption statistics, which are exchange between the controller 1402 and small cell backhaul nodes 1404 using PAL (Primary Access License) channels 1408 of the CBRS spectrum to transmit control information and GAA (General Authorized Access) channels 1409 of the CBRS spectrum as well as portions of the PAL channels 1408 to transmit the data. OpenFlow is a communication protocol that provides access to the forwarding plane of the network switch or router over the network. OpenFlow enables network controllers to determine the path of network packets across a network of switches. The controllers are distinct from the switches. The separation of the controller from the forwarding allows for more sophisticated traffic management than is feasible using access control lists and routing protocols. Also, OpenFlow allow switches from different vendors to be managed remotely using a single, open protocol. OpenFlow is an enabler of software defined networking.

OpenFlow allows for the remote administration of a layer 3 switch's packet forwarding tables, by adding, modifying and removing packet matching roles in action. Routing decisions can be made periodically or ad hoc by the controller and translated into rules and actions with a configurable lifespan, which are deployed to a switch's flow table, leaving the actual forwarding of matched packets to the switch at wire speed for the duration of those rules. Packets which are unmatched by the switch can be forwarded to the controller. The controller decides to modify existing flow table rules on one or more switches or to deploy new rules, to prevent a structural flow of traffic between switch and controller. It could even be decided to forward the traffic itself, provided that it is told the switch to forward entire packets instead of just the header. The OpenFlow protocol is layered on top of the transmission control protocol and proscribes the use of transport layer security.

Figure 15:
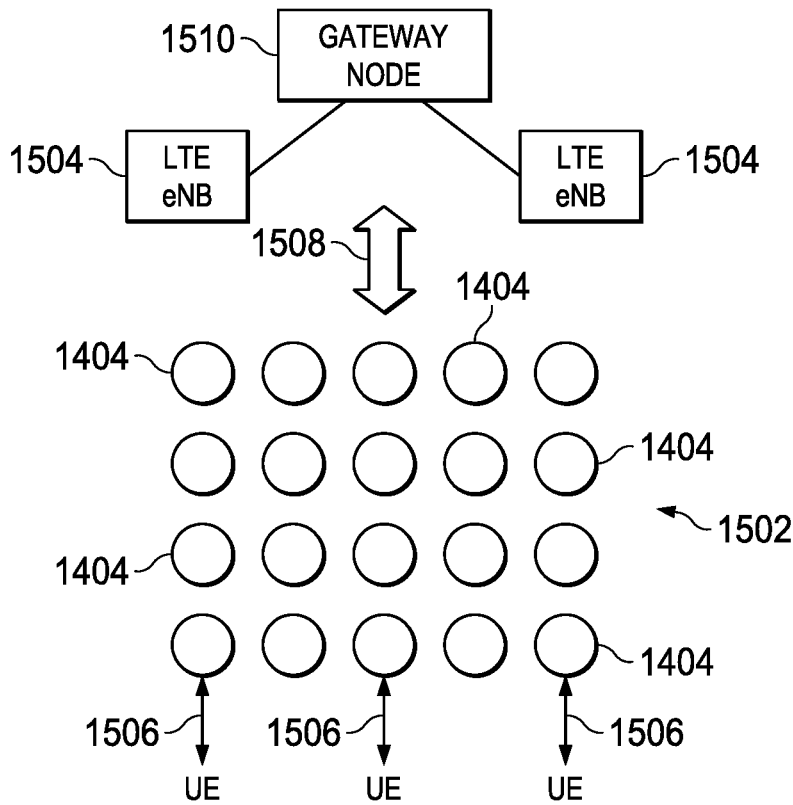
FIG. 15 illustrates a heterogeneous network using CBRS.

Referring now to FIG. 15, there is illustrated a heterogeneous network (HetNet) 1502. In a HetNet, a dense small cell network 1502 comprised of a number of small cell nodes 1404 that coexist with an overlay of CBRS eNBs 1504 providing the basic coverage. In such a deployment, traffic from user equipments (UE) 1506 are forwarded from the small cell node 1504 over multiple wireless backhaul links 1508 to a gateway node 1510, which is typically co-located at the eNBs 1504. Thus, in a multi-hop deployment, routing and forwarding are crucial aspects to consider, since they have to dynamically power on and off nodes 1504, according to traffic demand changes creating a liquid wireless backhaul where network resources are used where they are needed. Multi-hop deployment is used for routing and forwarding of the data plan over a CBRS network.

With software defined networking (SDN), packet forwarding can be handled by a centralized controller 1402 (FIG. 14), in a flexible and effective way. Adding device configuration capabilities for this kind of architecture allows small cell wireless networks to be fully managed. In a typical SDN-based architecture, the SDN controller 1402 sends OpenFlow messages that must be routed over the wireless links 1408 towards the nodes 1404. This can lead to potentially long latency.

An SDN-based network architecture for small cell backhaul operation and management is proposed for dealing with these latency issues. Referring now to FIG. 16, based on the HetNets concept, the proposed SDN controller 1602 transmits OpenFlow messages 1604 via PAL control channels 1606 directly to small cell nodes 1608. Extensions to the OpenDaylight (ODL) controller 1610 provide the necessary resilient routing infrastructure for a small cell backhaul operation. A backhaul orchestrator 1612 dynamically optimizes the small cell backhaul by minimizing power and latency while maximizing the capacity of the backhaul network.

Figure 17:
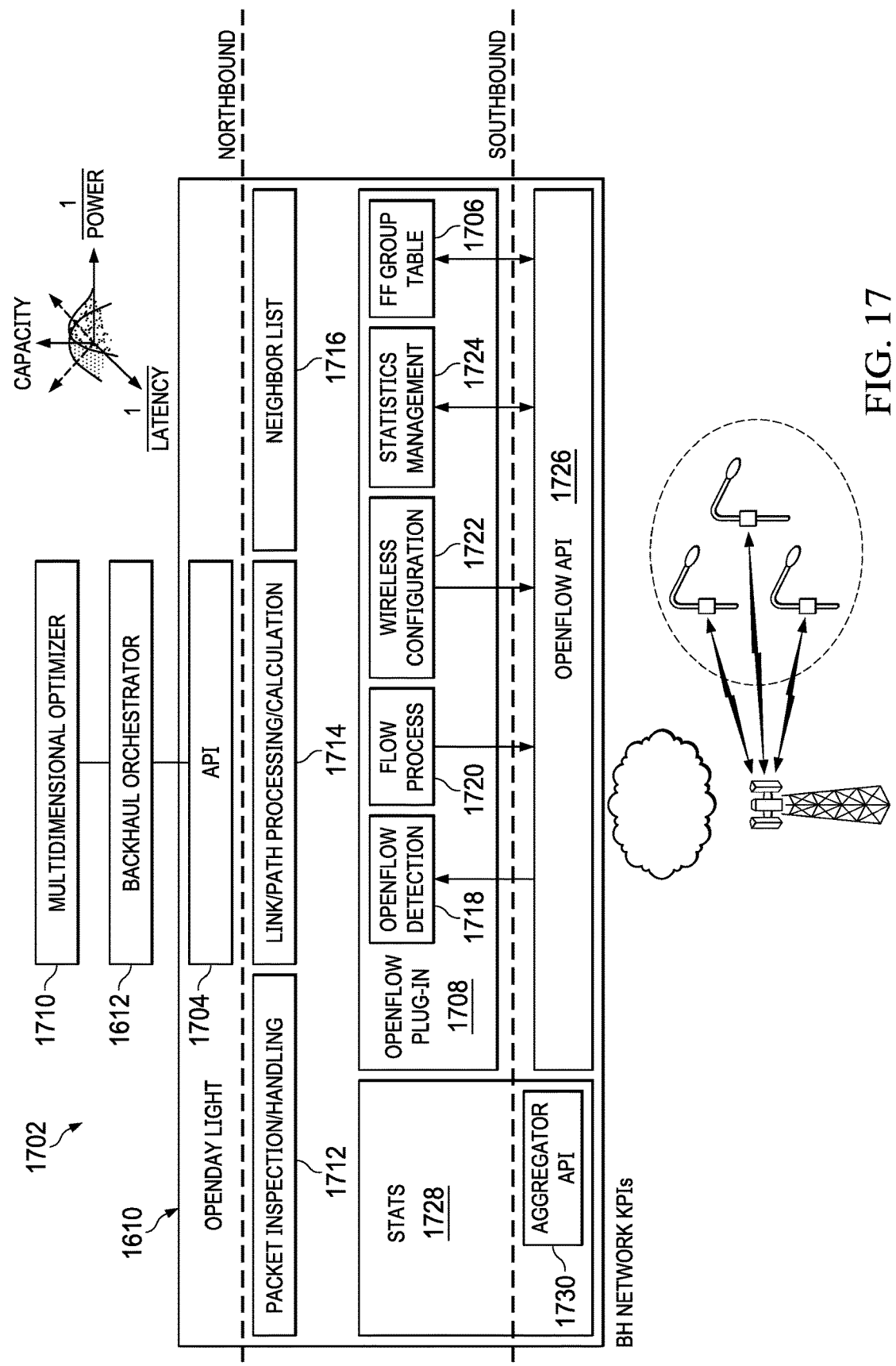
FIG. 17 illustrates a block diagram of a Backhaul Network Key Performance Indicator in a CBRS network.

Referring now also to FIG. 17, there is illustrated a more detailed description of a backhaul network KPI (key performance indicator) 1702. The backhaul network KPI 1702 is implemented within the SDN controller 1602 to enable communications between the SDN controller and small cells within the small cell backhaul network. As mentioned previously, the OpenDaylight controller 1610 provides routing infrastructure for the small cell backhaul operation. The OpenDaylight controller 1610 utilizes an application program interface 1704 for enabling communications between the controller 1610 and a backhaul orchestrator 1612. The backhaul orchestrator 1612 dynamically optimizes the small cell backhaul by minimizing power and latency while maximizing the capacity of the backhaul network. The backhaul network KPI 1702 must maintain a communication channel 1606 with the SDN controller 1704 in order to be able to exchange control plane messages with the small cell nodes 1608 over the PAL. This communication channel 1606 can be established in the same network interface as the one used for the data plane (in-band connectivity) or in a different interface (out-of-band). With in-band connectivity, the infrastructure costs are reduced, but if link failure occurs, the node loses the connection with the controller 1610. Out-of-band control plane connectivity requires an additional NIC (network interface controller) in the managed devices. A PAL interface 1610 (FIG. 16) is used on each SDN enabled small cell backhaul node 1608 for SDN control plane connectivity, in order to provide a robust channel and reduce SDN control latency while the data plane is using the multi-hop backhaul connectivity over a GAA layer and portions of the PAL layer of a CBRS network.

Small cell wireless backhaul links may have dynamic link outages, when operating at CBRS band. A link can temporarily go from non-line of sight to outage (e.g. due to blockage), leading to changes in the backhaul topology and consequently, in the available capacity. When such events happen, the SDN controller 1602 can perform path recalculation between the backhaul small cell nodes 1608 but the process may take a significant amount of time. The backhaul network KPI 1702 as illustrated in FIG. 17 uses fast failover (FF) group tables 1706 from the OpenFlow plug-in 1708 to rapidly repair link failures locally.

The backhaul orchestrator 1612 communicates with the multidimensional optimizer 1710. The Orchestrator Interface 1704 is used to communicate with the backhaul orchestrator 1612 in order to perform the reconfiguration of the small cell backhaul network and transceivers providing links to nodes and the SDN controller. Also, this configuration can be triggered by the backhaul orchestrator 1612 through this REST API. The new configurations are pushed to the wireless communications services (WCS) and new paths are requested to the Path Calculator. The multidimensional optimizer 1710 finds a maximum value based upon latency, capacity and 1/power using Euler-Lagrange multipliers. The backhaul network KPI 1702 further includes a packet inspection/handling module 1712. The packet inspection/handling module 1712 inspects and controls the data packets that are transmitted over the communications channels 1603 to the small cell nodes 1608. The packet inspection/handling module 1712 parses packets sent to the SDN controller 1602 (e.g. for new flows when no rules are installed at the small cell backhaul nodes 1608). The extracted information is sent to the path calculator 1714, which replies with a primary path from the source to the destination node according to a given path calculation strategy. The original packet is then sent back to the destination node.

The path calculator 1714 is responsible for calculating alternate paths to the small cell nodes 1608 when existing links fail. The path calculator 1714 computes paths between the powered on small cell backhaul nodes 1608 and instructs the installation of new forwarding rules. The path calculator 1714 uses a network graph that contains only the active nodes. If the fast failover (FF) strategy is active, a maximum disjoint path is also calculated from each intermediate node, and the required forwarding rules are installed in combination with the usage of the FF group table 1706 feature from OpenFlow. The link/path processing calculation module 1714 uses information from the neighbor list 1316 to make the new path calculations. The neighborhood mapper 1716 is a database list of small cell nodes and their associated neighboring nodes. The neighborhood mapper 1716 infers the neighborhood and interference graph for each node/link from the existing topology. Small cell backhaul nodes 1608 send out periodic beacons to neighbors. The collected information statistics are sent to the SDN controller 1602 and used to augment existing data from the backhaul links The OpenFlow plug-in 1708 includes an OpenFlow detection module 1718 for detecting OpenFlow messages. The flow process module 1720 calculates the message routing. The wireless configuration service 1722 sends wireless specific configuration requests to the managed small cell backhaul nodes 1608 through an OpenFlow protocol extension. The Wireless Statistics Manager 1728 collects wireless related statistics from the managed small cell backhaul nodes 1608 over an aggregator API 1730 through an extension of the statistics manager component 1724 from the OpenFlow Plugin 1708. The statistical information is fed to the statistics module 1724 from the small cell nodes 1608. The requests and statistics can have different types, which are specified by a bit mask field in the request body. Each of the modules within the OpenFlow plugin 1708 communicates with the small cell nodes 1608 through an OpenFlow API 1726. A metrics collector 1728 is responsible for obtaining network performance metrics that cannot be directly retrieved through OpenFlow plug-in 1708. The metrics are obtained through the aggregator API 1730. The calculated data is merged into the available statistics and can be used by every other SDN controller 1602 component.

The citizens broadband radio service (CBRS) comprises a shared wireless communication spectrum providing three tiers of usage rights as illustrated in FIG. 18. The first tier 1802 includes incumbents that are currently utilizing the CBRS spectrum. These include the U.S. Navy which has absolute priority over all other users, fixed satellite services (FSS) on the transmission side and wireless ISPs which are required to migrate to CBRS by 2020. The primary access license (PAL) tier 1804 exists in the 3550-3650 MHz frequency range. An organization can pay a fee to be assigned a 10 MHz block for a limited geographic area for a three-year period, giving them priority over other users. No more than seven such blocks with beacons are currently allocated within the same geographic area. Only the lower 100 MHz of the CBRS band will be auctioned off, and up to seven total PALs may be assigned in any given census tract with four PALs going to any single applicant. Applicant's may acquire up to two consecutive PAL terms in any given license area during the first spectrum auction. The general authorized access (GAA) tier 1806 comprises any portion of the 3550-3700 MHz band not assigned to a higher tier user and may also operate opportunistically on unused priority access channels. This comprises the standard service used by the majority of users.

Referring now to FIG. 19, there is illustrated interaction between a citizens broadband service device (CBSD) 1902 and a spectrum allocation server (SAS) 1904. To use CBRS spectrum, a CBSD 1902 sends a request 1906 for a band assignment from the SAS 1904. The request 1906 includes information such as its location, and 10 a pattern, transmission power, license class and desired channel along with the request for transmissions. The SAS 1904 programmatically determines a band and transmits the band assignment 1906 back to the CBSD 1902 using terrain and radio propagation data responsive to the request 1906. The SAS 1904 uses knowledge of devices to determine if the requesting CBSD 1902 four cause interference to higher tier users of the spectrum. No protection or coordination is provided among devices communicating over the GAA channel. The SAS 1904 is not a real time scheduler. The CBSD device 1902 may consist of either a Category A device or Category B device. The CBSD must be a base station or a high power terminal that has registered as a CBSD device. Low power terminals are not directly managed by the SAS 1904. A Category A CBSD provides 30 dBm EIRP (1 W) per 10 MHz and the device may be located within a fixed location either indoors or outdoors. The antenna of a category A CBSD has a length of less than 6 m in length. A Category B CBSD provides 47 dBm EIRP (50 W) per 10 MHz and may be located outdoors only. The antennas require professional installation and have a length of less than 6 m. CBSD devices have a vertical positioning accuracy of +/−3 m. CBSD terminals have 23 dBm EIRP (0.2 W) per 10 MHz and are allowed mobility.

Referring now also to FIG. 20, there is illustrated a flow diagram of the interaction process between the CBSD 1902 and SAS 1904. Prior to transmission the CBSD 1902 provides various CBSD data at step 2002 to the SAS 1904. The CBSD data may include where the devices located, the devices and antenna pattern, the devices transmission power, the devices license class and the desired channel. Next, at step 2004, the CBSD 1902 sends a transmission request to the SAS. The transmission requests only apply to fixed base stations that are transmitting from the nodes 1608. The node 1608 will only comprise high power terminals which must be registered as CBSD devices. Low power terminals are not directly managed by the SAS 1904. The SAS 1904 utilizes the provided information to determine interference issues at step 2006. The SAS 1904 uses knowledge of transmitting devices to determine if the requesting device will cause interference to a higher tier of users of the CBRS spectrum. These determinations are only utilized within PAL devices and no protection or coordination is provided among GAA devices. The SAS 1904 does not make the interference issue determinations in real time and determines at inquiry step 2008 if issues are present. If issues are present, the band assignment is denied at step 2010. If inquiry step 2008 determines that no interference issues exist, the requested band is assigned at step 2012.

Figures 21, 22:
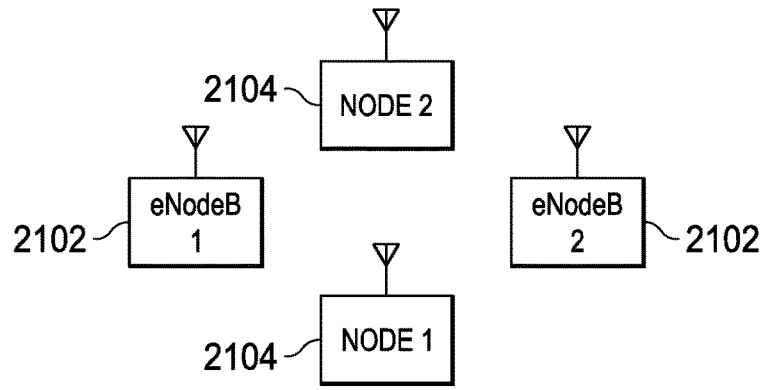
FIG. 21 illustrates a pair of eNodeB nodes and a pair of UE network nodes.
FIG. 22 illustrates the subframe structure of a CBRS channel.

Referring now to FIG. 21, there are illustrated a pair of eNodeB nodes 2102 and small cell nodes 2104. The CBRS band over which the nodes communicate is a TDD (time division duplex) band. The implementation of the CBRS band within a small cell network of nodes causes the network to operate differently than previous LTE-TDD bands. The difference spectrum emissions mask network requirements and enable localized non-planned deployments of new small network nodes. Problems can occur when one node is in a receive mode while nearby devices are in a transmitting mode. For example, when eNodeB 1 and UE 2 are communicating while eNodeB 2 and UE 1 are communicating normal interference occurs between the transmissions. When UE 1 is communicating with UE 2 or when eNodeB 1 is communicating with eNodeB 2, significant interference issues are created. Poor timing in the transmissions can affect interference rejection algorithms within the transmissions.

Figure 23:
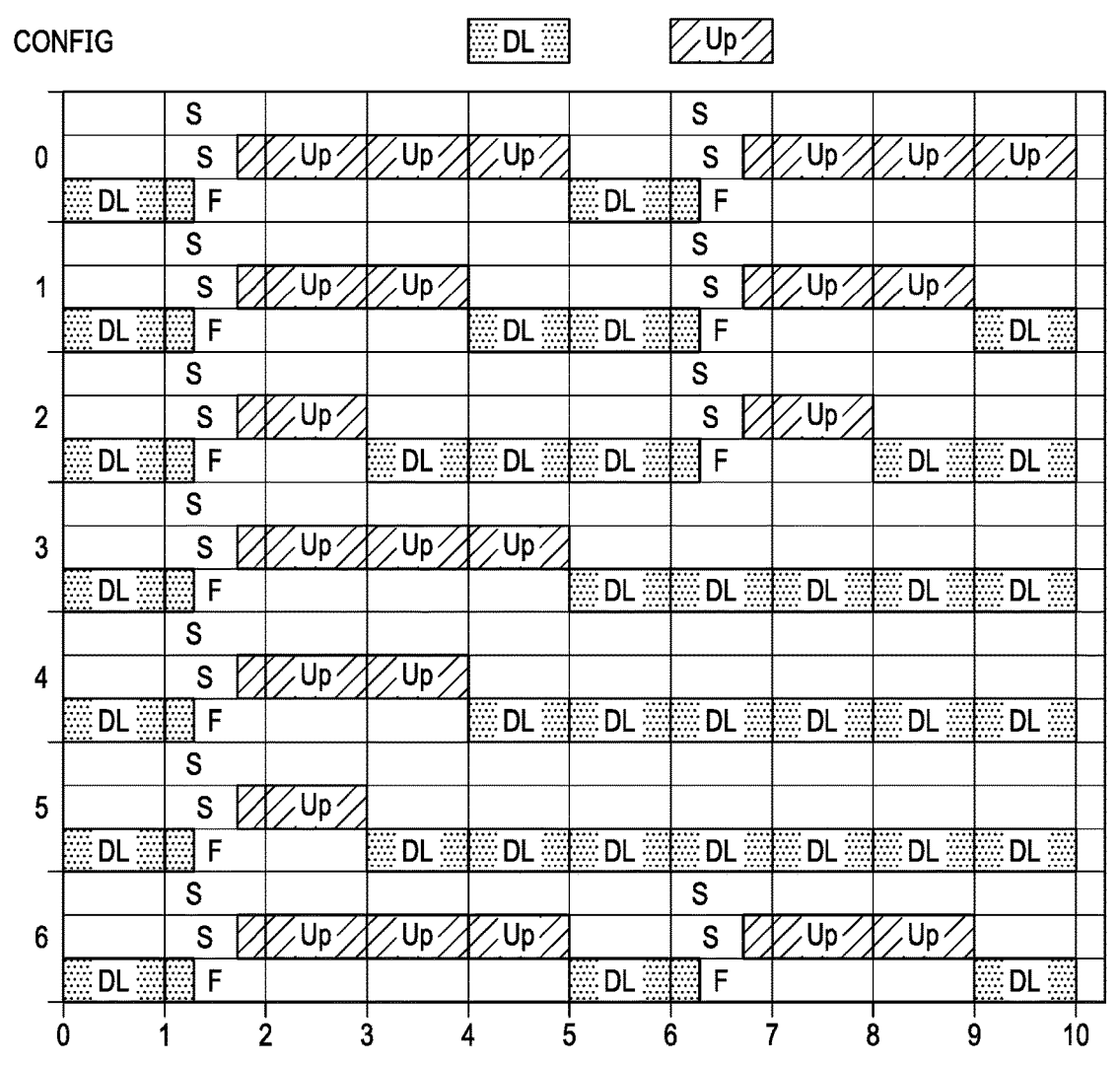
Figure 24:
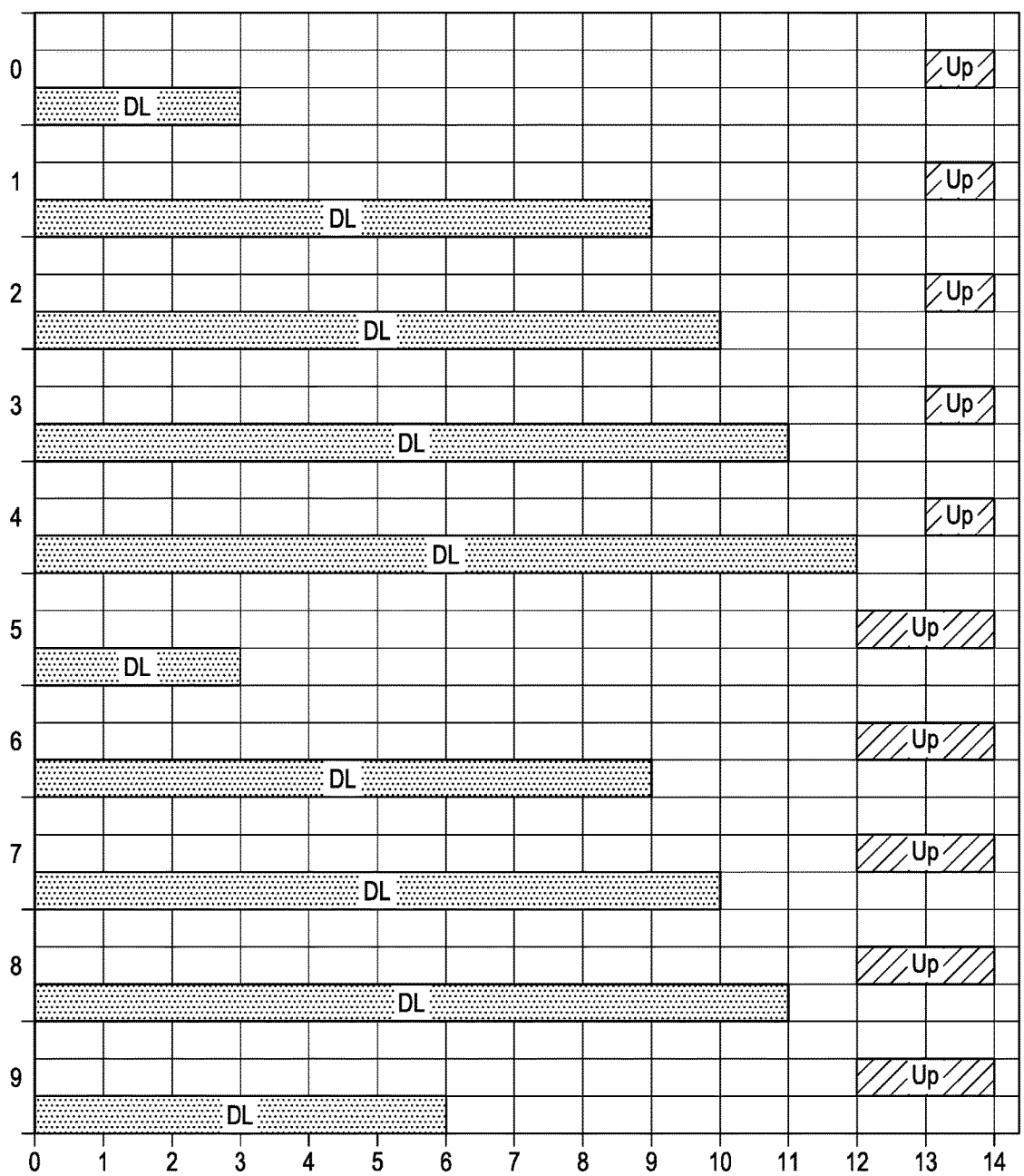
FIG. 24 illustrates the downlink to uplink switch point at eNodeBs.

Referring now to FIG. 22, there are illustrated the various configurations of the subframe numbers 2202 for various uplink-downlink configurations 2204. The indicator D is associated with a downlink subframe, the indicator U is associated with an uplink subframe and the indicator S is associated with a special subframe. FIGS. 23 and 24 provide further illustrations of the subframe structure with FIG. 24 relating to the downlink to uplink switch point at an eNodeB. In the illustrations of FIGS. 23 and 24, DL relates to the downlink, Up relates to the uplink and SSF relates to the special frame.

When switching from a downlink to an uplink in communications between a pair of UEs, the beginning of UE1's PRACH transmission should not be earlier than the end of UE2's DL reception as illustrated by:

$$t_{error} < t_{GP} - 15 \ \mu s - t_{UE,RX \to TX} - (t_{prop,enb2-UE2} - t_{prop,enb1-UE1})$$

this does not present a problem in less UE2 is much farther away from eNB2 then UE1 one is from eNB1. This only occurs in a network where eNB's have vastly different transmission power levels. These requirements can be met by increasing the guard.

When switching from downlink to up link between a pair of eNBs, if the downlink from eNB2 is delayed too much, the downlink can interfere with reception of PRACH by eNB1 as illustrated by:

$$t_{error} < t_{GP} - 15 \ \mu s - t_{BS,TX \to RX} - t_{prop,enb1-enb2}$$

Figure 25:
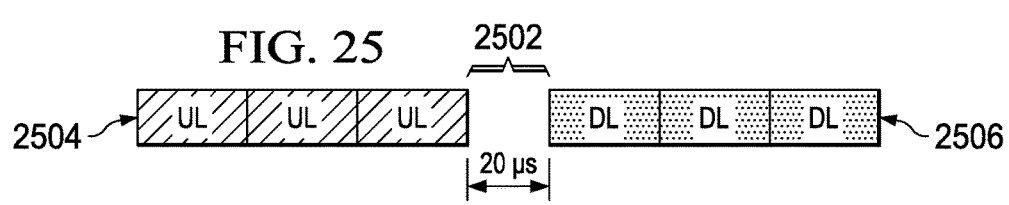
FIG. 25 illustrates a guard between uplink and downlink frames when switching therebetween by eNodeBs.

This is not a problem in less eNBs are separated by large distances. In that case, signal power is very weak and can be overcome by increasing the guard period 2502 as illustrated in FIG. 25. In this case, the guard 2502 between the uplink transmissions 2504 and downlink transmissions 2506 is 20 μs.

UE1 must stop transmitting before UE2 starts receiving such that:

$$t_{error} < 20 \ \mu s - t_{UE,TX \to RX} + t_{prop,enb1-UE1} + t_{prop,enb2-UE2}$$

Figure 26:
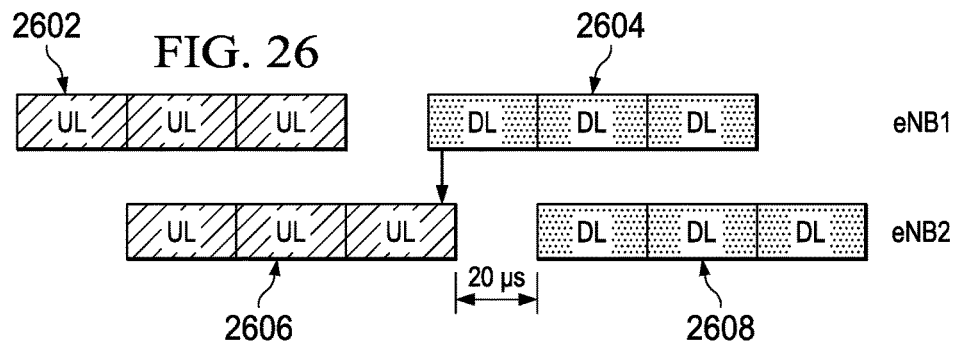
FIG. 26 provides a further illustration of guard periods between uplink and downlink frames.

Theoretically, for UEs very close to their small cell base stations, $t_{error}$ is approximately equal to zero. This depends on $t_{ue,TX \to RX}$.

eNB2 should not begin transmitting before eNB1 has finished receiving such that $t_{error} < 20 \ \mu s - t_{BS<TX \to RX}$ this depends on $t_{BS<TX \to RX}$ which is specified at approximately 17 μs and $t_{error} < 3$ μs. This is illustrated in FIG. 26, wherein the eNB1 uplink transmissions 2602 and downlink transmissions 2604 are illustrated with respect to the eNB2 uplink transmissions 2606 and downlink transmissions 2608.

The final time expect for CBRS was chosen to be 3 μs in 2008. Timing is not as much of an issue for handover within an LTE system. All handovers are hard handovers requiring initial PRACH transmissions. Timing is much more of an issue within WCDMA.

Referring now to Table 2, there is illustrated the channel coherence time at 3.5 GHz for UEs traveling at various speeds. Ranging from the UE speed of 0 km/h that has an infinite channel coherence time and UEs traveling at 10 km/h having a 0.4 ms channel coherence time.

TABLE 2

| UE Speed | Channel Coherence Time |
|---|---|
| 0 kph | Infinite* |
| 3 kph | 13 ms |
| 10 kph | 4 ms |
| 30 kph | 1.3 ms |
| 100 kph | 0.4 ms |

Figure 27:
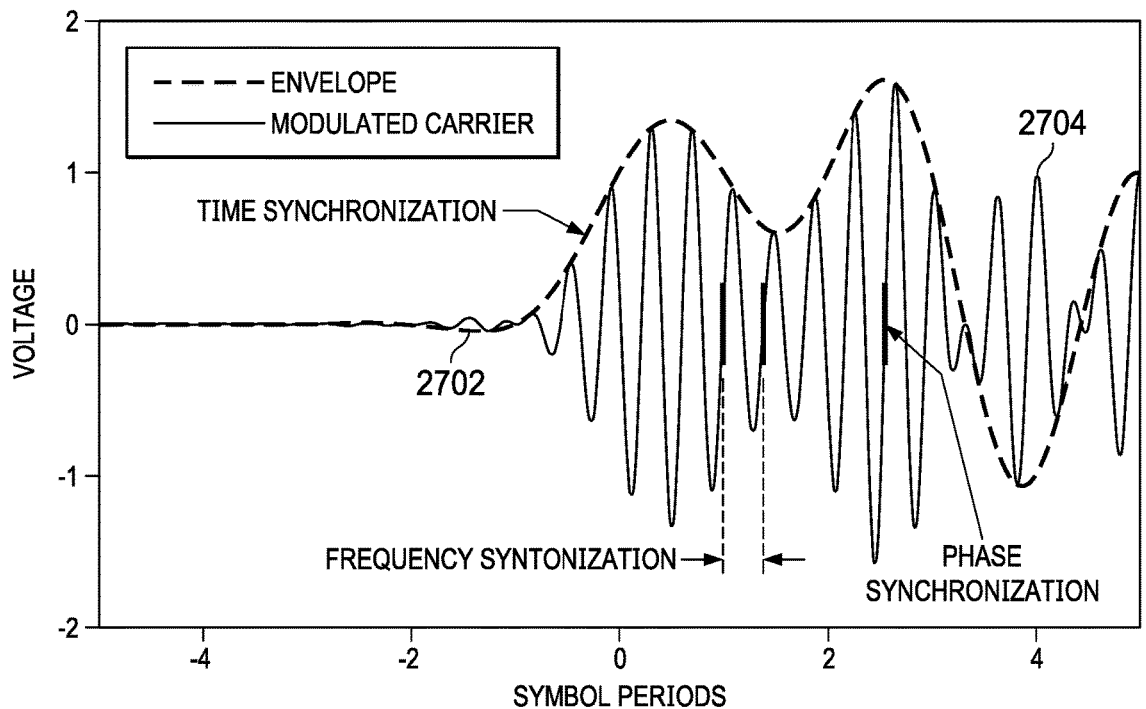
FIG. 27 illustrates a graph of voltage versus symbol period.

FIG. 27 represents the voltage versus symbol periods for transmitted CBRS signal. Line 2702 represents the signal envelope while line 2704 represents the modulated carrier. Table 3 represents the FrTiPh stability requirements. The table illustrates the synchronization domain, stability requirements, and geographical area.

TABLE 3

| Synchronization Domain | Stability Requirements | | Geographical area |
|---|---|---|---|
| Frequency Syntonization | Short term and long term | ADEV < 50e−9 | 1 eNB |
| Time Synchronization | Short term and long term | TDEV < 1.5 μs | Entire Network |
| Phase Synchronization | Short term | TDEV(4 ms) < 10 ps | CoMP area |

Figure 28:
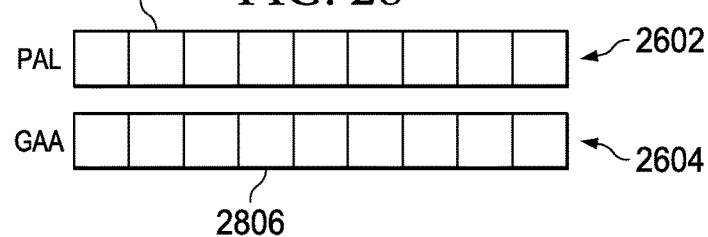
FIG. 28 illustrates the use of CBRS subframes for transmitting both control channel and data information.

Referring now to FIG. 28, there are illustrated the PAL channel 2802 and the GAA channel 2804 as discussed hereinabove. Each of the PAL channel 2802 and the GAA channel 2804 have the frame structure described hereinabove such that each includes a number of subframes 2806. Within the GAA 2804, each of the subframes 2806 are assigned for the transmission of data between the transmission and reception nodes. However, within the PAL 2802 the subframes 2806 may be configured to transmit either control channel information or data channel information. This enables the PAL 2802 to transmit both control channel information and data while the GAA 2804 transmits only data.

Figure 29:
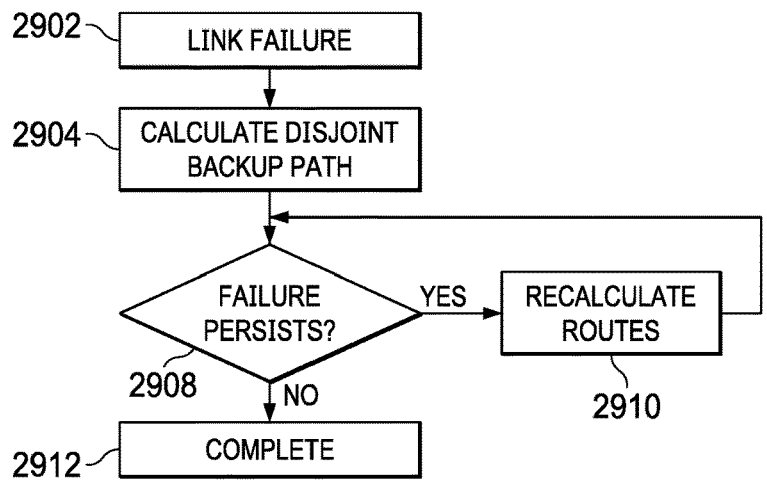
FIG. 29 is a flow diagram illustrating the process for link repair.

Referring now to FIG. 29, there is illustrated a flow diagram of the process for link repair. Upon occurrence of a link failure at step 2902 a disjoint backup path toward the gateway node 1110 at each small cell backhaul node 1004 is calculated at step 2904 using the fast failover group tables 1296. If the failure that triggered the usage of a different network path persists, as determined at inquiry step 2908, the controller 1292 week calculates new routes at step 2910 based upon the current apology and previously calculated energy optimization strategies. Control then passes back to inquiry step 2908 to determine if the failure persists. When the failures do not persist, the process is completed at step 2902.

With SDN it is possible to have flexible path calculation strategies act on detailed forwarding decisions. For multi-hop small cell backhaul networks, it will be essential to control the existing paths latency. This requires an estimation of the delay for each link and path at the SDN controller 1202 which can also depend on existing queuing strategies to implement control of existing paths' latency. Therefore, some flows might be routed along low latency paths, while others are routed to higher latency paths with higher capacity. New routing algorithms might be needed, allowing fast path calculation while supporting multiple constraints (bandwidth, latency, capacity and power). Therefore, the SDN-based network would manage flow rules, wireless link and our management parameters. The SDN based network interacts with a backhaul orchestrator 1212, responsible for optimizing the backhaul network operation.

Figure 30:
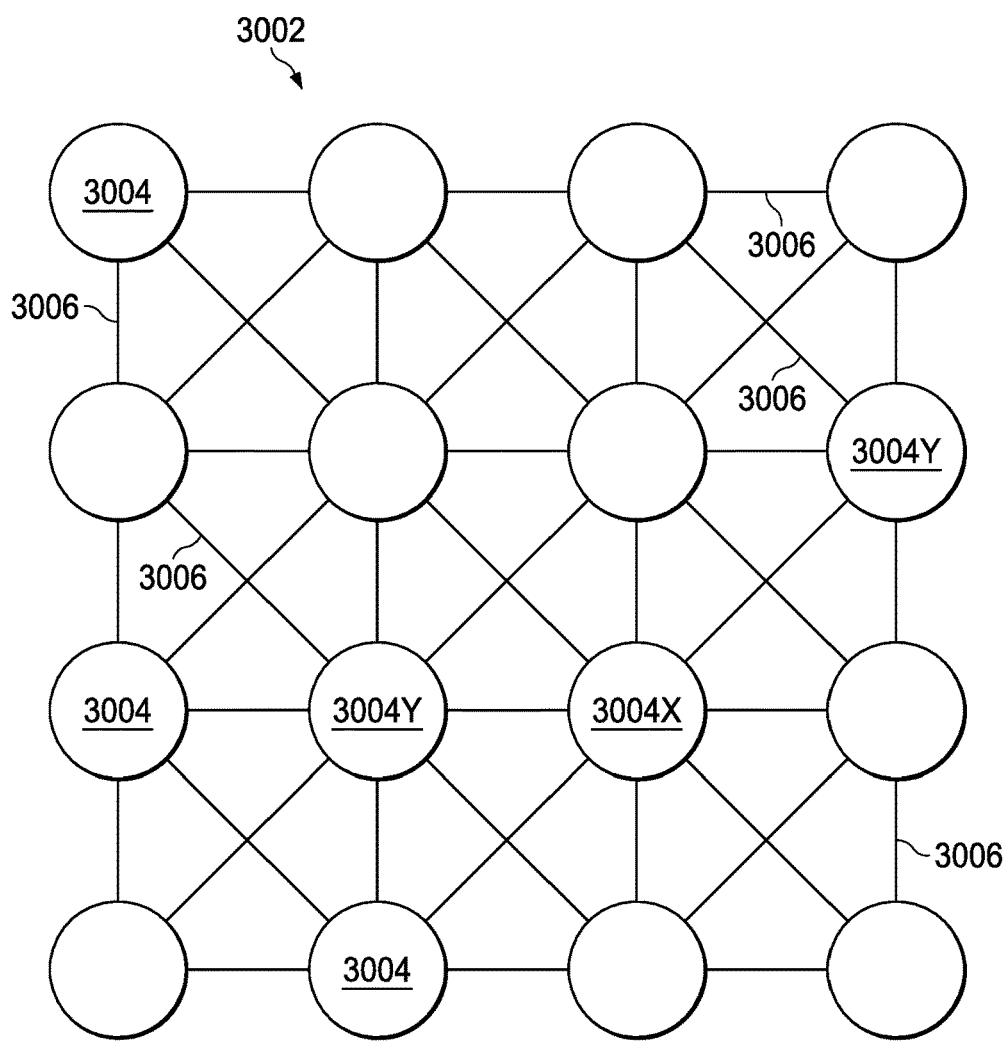
FIG. 30 illustrates a small cell backhaul network.

Due to the increasing traffic demand, existing mobile access and backhaul networks face a capacity problem. In order to increase the capacity, it is customary to deploy many small cells which may be dynamically controlled based upon traffic demand as illustrated in FIG. 30. The small cell backhaul network 3002, as described previously, consist of a plurality of individual small cell nodes 3004 that are interconnected via communication links 3006 provided by transceivers. Each of the small cell nodes 3004 are interconnected with each of the small cell nodes within its vicinity via one of the communication links. Thus, for example as illustrated in FIG. 30 node 3004x is interconnected with each of the surrounding nodes 3004y (in this case eight nodes) through an associated communication link 3006. Thus, node 3004x can communicate over the small cell backhaul network 3002 through any of the adjacent small cell network nodes 3004y.

Figure 31:
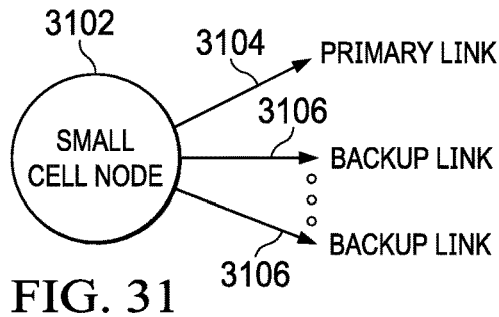
FIG. 31 illustrates a small cell node having a primary link and one or more backup links.

A small cell backhaul network architecture based on the concept of software defined networking will be able to address these issues and provide a mmWave based mobile backhaul network. Referring now to FIG. 31, in order to cope with the dynamics of mmWave, the SDN control plane calculates for each small cell node 3102 a backhaul primary link 3104 and a set of backup links 3106. The set of backup links 3106 include at least one backup link which may be utilized if the primary link 3104 goes out. Using OpenFlow Fast Failover groups such as those described herein above, a fast local repair of a mmWave backhaul link 3106 can be achieved leading to a resilient backhaul mesh architecture. The proposed architecture leads to a lower packet loss and consequently higher throughput data rate and better network reliability.

Figure 32:
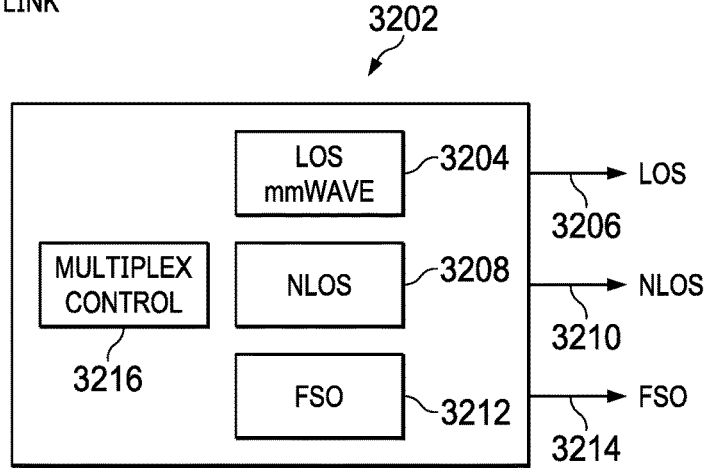
FIG. 32 illustrates a small cell node including means for multiplexing between multiple transceiver types.

Referring now to FIG. 32, network reliability may also be improved utilizing an architecture wherein each node 3202 uses SDN-based channel estimation to multiplex between line of sight (LOS) mmWaves, non-line of sight (NLOS) sub-6 GHz and free space optics (FSO) transmissions. This is achieved using a LOS mmWave transceiver 3204 for transmitting line of sight millimeter waves 3206, an NLOS transceiver 3208 for transmitting non-line of sight sub-6 GHz signals 3210 and a FSO transceiver 3212 for transmitting FSO signals 3214. Multiplexing control circuitry 3216 multiplexes between the LOS mmWave transceiver 3204, an NLOS transceiver 3208 and an FSO transceiver 3212 based upon the environmental and system operating conditions. When the atmospheric conditions are good, the network relies upon the FSO transceiver 3212. When atmospheric conditions become foggy or rainy, the system adaptively switches to RF LOS transceiver 3208 or the LOS transceiver 3204 using the multiplexer control 3216. If the operating environment has many physical obstacles between the transmitter and the receiver, the system would select the NLOS transceiver 3208.

Despite introducing new technologies at lower layers of the protocol such as better modulation and coding schemes or coordinating multipoint transmissions, the predicted demand is much higher than what can be supported with new physical layer only technologies in the short term. A common assumption to provide increased capacity at scale is to use a higher frequency band were more spectrum is available and to reduce the cell size in order to increase spatial reuse. Backhaul operation is often dominated by proprietary solutions which hinder innovation. An important challenge to solve for small cell backhaul links is an efficient but flexible forwarding architecture which relays user data over a multi-hop wireless backhaul between a plurality of small cell nodes.

Figure 33:
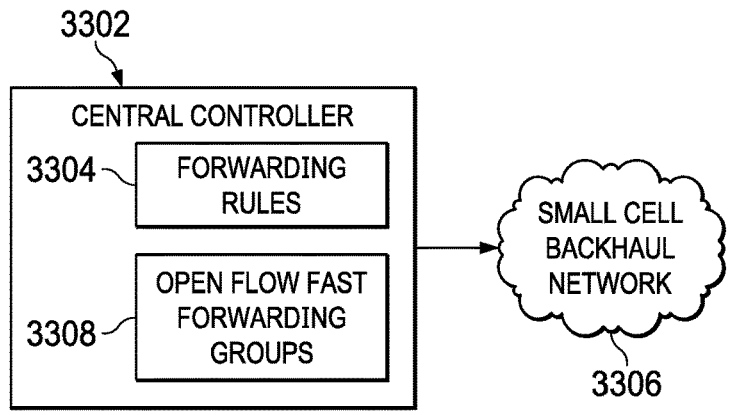
FIG. 33 illustrates an SDN-based architecture for link generation.

Referring now to FIG. 33, in a typical SDN-based architecture, a centralized controller 3302 installs within small cell nodes flexible rules 3304 that determine the forwarding behavior within the data plane. However, a forwarding configuration addressing the inherent resiliency challenges to cope with unstable backhaul links using a combined RF LOS, NLOS and FSO has not been previously addressed. A resilient forwarding configuration of an SDN-based small cell wireless backhaul network 3306 that focuses on SDN-based resiliency mechanisms and uses the concept of OpenFlow fast failover groups 3308 as described hereinabove. The controller 3302 calculates each link 3006 for each small cell node 3004 backup links toward the Gateway. The main link and the backup link are both placed into a fast failover group 3308. The small cell node 3004 uses rapid link monitoring to locally detect if a link is in the outage stage, in which case, the OpenFlow-based fast failover locally switches from a main link to a backup link.

The traditional SDN concept relies on a centralized control plane, which exercises control on forwarding decisions in the data plane. Consequently, the control and data planes are decoupled which allows a very flexible forwarding control. However, using SDN for small cell backhaul links present several challenges. This is because the performance and reliability of mesh-based backhaul networks such as that illustrated in FIG. 2 depends on fast local reactions to topology changes where a centralized control plane is typically too slow to react. Therefore, there been attempts to use proprietary routing and forwarding decisions based on distributed protocols were SDN is used to steer traffic.

Figure 34:
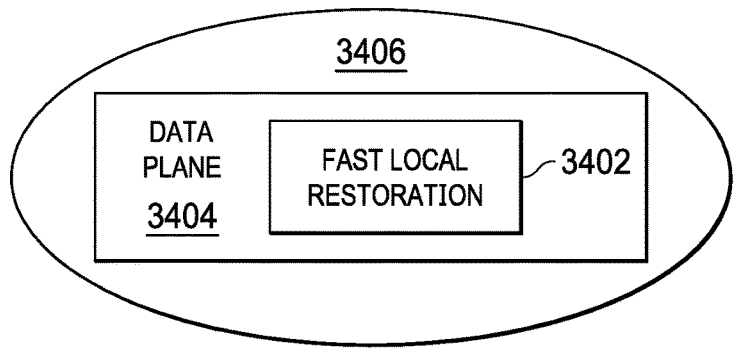
FIG. 34 illustrates a small cell node implementing fast local restoration within its data plane layer.

In an alternative approach as illustrated in FIG. 34, the forwarding decisions inside the backhaul may be configured by the SDN control plane. SDN-based resiliency using fast local restorations 3402 (e.g. implemented inside the data plane 3404 of the cell small backhaul nodes 3406) may be used whenever local problems such as link outage transitions of the millimeter wave backhaul links are detected. This local repair mechanism, which can be preinstalled, avoids the need to ask the controller how to react in a case when a neighbor node cannot be reached anymore and leads to a more robust data plane behavior.

Figure 35:
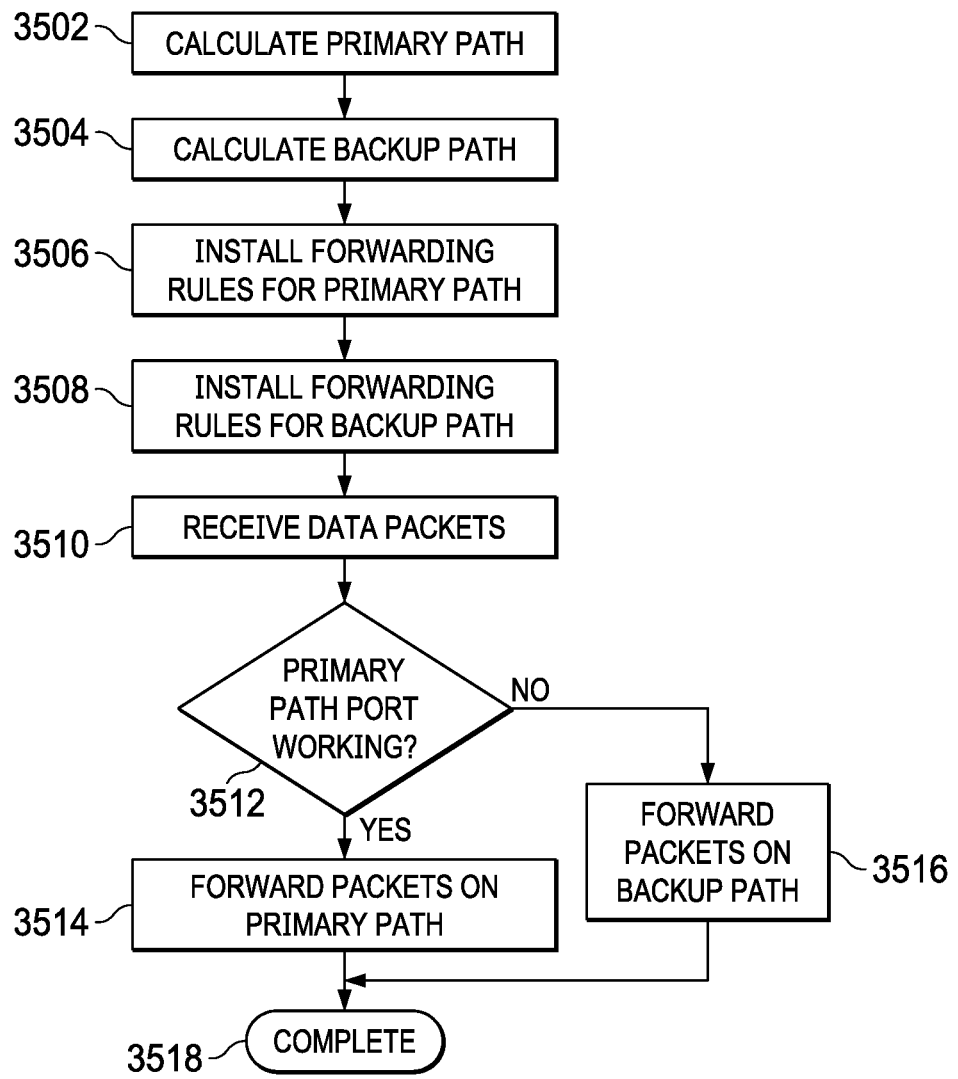
FIG. 35 illustrates a flow diagram describing the process for implementing SDN-based local repair.

Referring now to FIG. 35 there is illustrated the process for implementing SDN-based local repair. The process uses SDN to calculate a primary and a secondary path for small cell backhauling. SDN-based local repair is implemented using fast failover groups 3408 (FIG. 34). A primary and a secondary action are put into the same group. Consequently, the SDN controller calculates for each small cell a primary path at step 3502 towards the gateway. Additionally, the SDN controller calculates a backup path towards the gateway at step 3504. Based upon the path calculations, the SDN controller installs forwarding rules for the primary path at step 3506 into the fast failover group 3308 and will additionally install forwarding rules at step 3508 for the backup path into the fast failover group.

Once data packets arrive at a small cell node at step 3510 which should be forwarded to a neighboring small cell node using mmWave links, the data packets will be forwarded according to the first port in the fast failover group table whose port state is active. This requires an OpenFlow data path implementation which uses for each neighbor a dedicated OpenFlow port. Once the primary port is detected to be down, the data packets are automatically forwarded using the next active port, i.e. towards a different neighbor where there is an active backup link. Thus, a determination is made at inquiry step 3502 if the primary path is working. If so, control passes on to step 3514, and the packet is forwarded on the primary path. If inquiry step 3512 determines that the primary path is not working, the packet is forwarded on the backup path at step 3516. The process is then completed at step 3518. This process allows the small cell node to perform a local failover instead of the SDN controller performing a centralized failover. This significantly reduces the reaction time to failures in the mesh forwarding structure.

Figure 36:
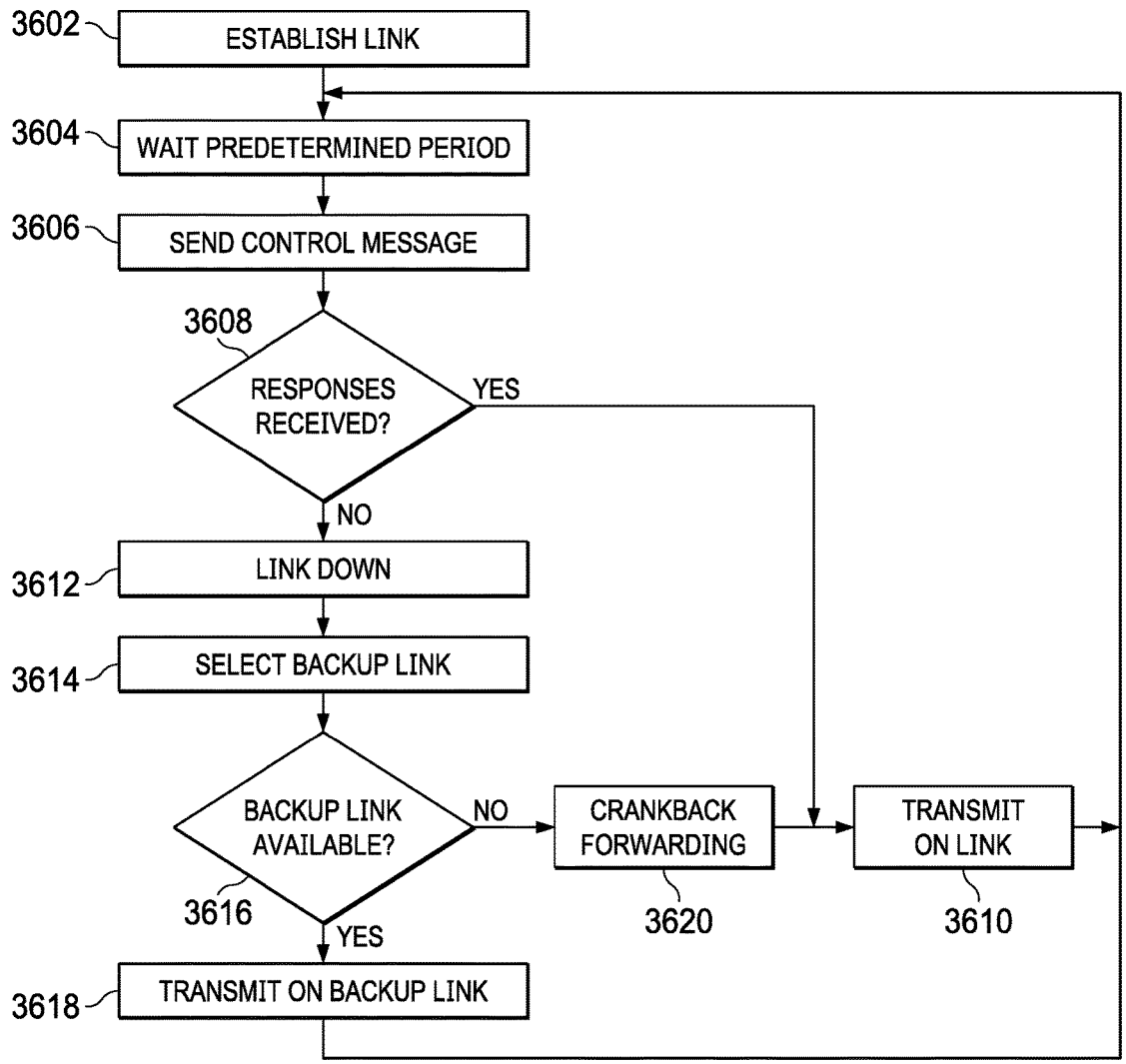
FIG. 36 illustrates a flow diagram describing the process for detecting link state and for the transmission on primary and backup links.

Referring now to FIG. 36, there is illustrated the process for detecting link state and transmitting on primary and backup links. In order to detect the link state, bidirectional forwarding detection (BFD) is a commonly used technology. BFD determines the state of the court by establishing a connection at step 3602 using a three-way handshake routine. BFD next waits a predetermined period of time at step 3604 and then transmits a periodic control message at step 3606. Inquiry step 3608 determines if a response to the control message has been received. The timeout period is determined by the control messages between the BFD messages. If a response to the control message is received, transmissions are carried out on the link at step 3610 and control passes back to step 3604 to await an additional predetermined period. If no response to the control message is received within a specified time interval, the link is considered down at step 3612. In this manner, link failures may be rapidly detected and reacted to. Consequently, small cell backhaul nodes would send periodic BFD messages to each neighboring backhaul node over the mmWave links to detect link states. Once BFD detects a link down event at inquiry step 3608, the link state is set to down at step 3612. This triggers the OpenFlow datapath to start transmitting to a different neighbor small cell. This is achieved by selecting a backup link at step 3614.

Alternatively, MAC layer protocol messages can be used in order to infer the state of the mmWave backhaul links, which could be integrated into the OpenFlow data path. The media access control (MAC) layer is a lower sublayer of the data link layer of the seven-layer OSI model. The Open Systems Interconnection model (OSI model) is a conceptual model that characterizes and standardizes the communication functions of a telecommunication or computing system without regard to their underlying internal structure and technology. Its goal is the interoperability of diverse communication systems with standard protocols. The model partitions a communication system into abstraction layers. The original version of the model defined seven layers.

A layer serves the layer above it and is served by the layer below it. For example, a layer that provides error-free communications across a network provides the path needed by applications above it, while it calls the next lower layer to send and receive packets that comprise the contents of that path. Two instances at the same layer are visualized as connected by a horizontal connection in that layer.

The MAC sublayer provides addressing in channel access control mechanisms that make it possible for several terminals or network nodes to communicate with a multiple access network and incorporates a shared medium, e.g. an ethernet network. The hardware that implements the Mac is referred to as the media access controller. The MAC sublayer axis the logical link controller (LLC) sublayer and the networks physical layer. The MAC layer emulates a full-duplex logical communication channel in a multipoint network. The channel may provide unicast, multicast or broadcast communication service.

A weakness with fast failover is that it can only perform local failover. If no alternative local path is available, e.g. all neighbors are not reachable anymore, then crankback routing must be performed. This requires that the packet be sent backwards toward the source to a small cell node which has an alternative active path towards the destination. Thus, crankback forwarding can potentially have large impacts on the latency. Such latency can be reduced significantly by introducing stateful forwarding in the data plane using OpenState. OpenState is a research effort focused in the development of a stateful data plane API for Software-Defined Networking. OpenState is more particularly described in the OpenState v 1.0 specification. If packets arrive at a small cell forwarding node which does not have a next hop towards the destination node because the link is down, the node tags the packet and the packet is sent back towards the source. When the message reaches the small cell node having a backup path, the state of the forwarding rules change in such a way that the coming packet traverse the backup path already at the node. Therefore, once a backup link is selected at step 3614, inquiry step 3616 determines if the backup link is operating and available. If so, transmissions are then carried out on the backup link at step 3618 and control passes back to step 3604. If the backup link is not available as determined at inquiry step 3616, the crankback forwarding process is carried out at step 3620 and transmissions carried out on allocated available link.

It will be appreciated by those skilled in the art having the benefit of this disclosure for using dedicated PAL band for control plane and GAA band as well as parts of the PAL band for data plane on a CBRS net provides improved link reestablishment. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system for providing small cell backhaul communication, comprising:
    a small cell backhaul network including a plurality of small cell network nodes each including transceivers enabling for communicating with at least two other small cell network nodes;
    a software defined network (SDN) controller for controlling the transceivers at each of the plurality of small cell network nodes establishing link configurations between the plurality of small cell network nodes of the small cell backhaul network; and
    wherein the SDN controller configures the transceivers to generate each of the link configurations between the plurality of small cell network nodes to enable control plane connectivity to communicate all control channel information between the plurality of small cell network nodes for the link configurations over a primary access license (PAL) control channel using a citizens broadband radio services (CBRS) band that enables software defined networking and to generate each of the link configurations between the plurality of small cell network nodes to enable data plane connectivity to communicate data channel information between the plurality of small cell network nodes for the link configurations over a general authorized access (GAA) channel using the CBRS band that enables software defined networking, wherein use of the PAL control channel in the link configurations for communication of all control channel information between the plurality of small cell network nodes reduces latency between the SDN controller and the plurality of small cell network nodes.

2. The system of claim 1, wherein the SDN controller gathers wireless and power consumption statistics for transmission over the PAL control channel.

3. The system of claim 1, wherein each of the plurality of small cell network nodes further includes a PAL interface for establishing an PAL control channel from the transceivers to the SDN controller as the control channel for communicating the control channel information with each of the small cell network nodes.

4. The system of claim 1, wherein the SDN controller configures the transceivers at the plurality of small cell network nodes to communicate data between the plurality of small cell network nodes over a general authorized access (GAA) channel of the citizens broadband radio services (CBRS) band that enables software defined networking.

5. The system of claim 4, wherein the SDN controller uses multi-hop deployment between multiple small cell network nodes of the plurality of small cell network nodes for routing of data over the CBRS band to the plurality of small cell network nodes.

6. The system of claim 1, wherein the SDN controller further comprises an optimizer that implements policies to minimize power consumption and latency and maximize capacity.

7. The system of claim 1, wherein the SDN controller uses fast failover group tables from OpenFlow to repair local link failures with the plurality of small cell network nodes.

8. The system of claim 1, wherein the SDN controller estimates a delay for each link between the SDN controller and the plurality of small cell network nodes to control path latency.

9. The system of claim 1, wherein the plurality of small cell network nodes communicates using OpenFlow communications protocol.

10. The system of claim 1 further including an OpenDaylight (ODL) controller implementing extensions for providing a routing infrastructure for the small cell backhaul network.

11. The system of claim 1, wherein the SDN controller configures the PAL control channel to include a plurality of subframes that may transmit either the control channel information or data channel information and configures the GAA channel to include a plurality of subframes that transmit only the data channel information.

12. A system for providing small cell backhaul communication, comprising:
- a small cell backhaul network including a plurality of small cell network nodes each including transceivers for communicating with at least two other small cell network nodes of the plurality of small cell network nodes;
- a software defined network (SDN) controller for controlling the transceivers at each of the plurality of small cell network nodes establishing link configurations between the plurality of small cell network nodes of the small cell backhaul network;
- wherein the SDN controller configures the transceivers at the plurality of small cell network nodes to generate each of the link configurations between the plurality of small cell network nodes to enable control plane connectivity to communicate all control channel information for the link configurations with the plurality of small cell network nodes over a primary access license (PAL) control channel using a citizens broadband radio services (CBRS) band that enables software defined networking, wherein the PAL control channel is configured to include a plurality of subframes that may transmit either the control channel information or data channel information;
- wherein each of the plurality of small cell network nodes further includes an primary access license (PAL) interface for establishing the PAL control channel to the SDN controller for communicating all the control channel information with each of the small cell network nodes;
- wherein the SDN controller configures the transceivers at the plurality of small cell network nodes to generate each of the link configurations between the plurality of small cell network nodes to enable data plane connectivity to communicate the data channel information for the link configurations with the plurality of small cell network nodes over a general authorized access (GAA) channel of the citizens broadband radio services (CBRS) band that enables software defined networking, wherein the GAA channel is configured to include a plurality of subframes that transmit the data channel information; and
- wherein transmission of all the control channel information on the PAL control channel for each of the link configurations between the plurality of small cell network nodes reduces latency between the SDN controller and the plurality of small cell network nodes.

13. The system of claim 12, wherein the SDN controller gathers wireless and power consumption statistics for transmission over the control channel.

14. The system of claim 12, wherein the SDN controller uses multi-hop deployment for routing of data over a CBRS band to the plurality of small cell network nodes over a GAA channel.

15. The system of claim 12, wherein the plurality of small cell network nodes communicates uses a communications protocol comprising OpenFlow.

16. The system of claim 12, wherein the SDN controller uses fast failover group tables from OpenFlow to repair local link failures with the plurality of small cell network nodes.

17. The system of claim 12, wherein the SDN controller estimates a delay for each link between the SDN controller and the plurality of small cell network nodes to control path latency.

18. A method for providing small cell backhaul communication, comprising:
- establishing a first communications link between each of a plurality of small cell network nodes of a small cell backhaul network and a software defined network (SDN) controller for controlling a second communications link configuration between the plurality of small cell nodes of the small cell backhaul network using transceivers located at each of the plurality of small cell nodes;
- communicating all control channel information within each of the first communications links between each of the plurality of small cell network nodes over a primary access license (PAL) control channel using a citizens broadband radio services (CBRS) band that enables software defined networking;
- communicating data channel information within each of the first communications links between each of the plurality of small cell network nodes over a general authorized access (GAA) channel of the citizens broadband radio services (CBRS) band that enables software defined networking; and
- wherein use of the PAL control channel in link configurations for communication of all control channel information between the plurality of small cell network nodes reduces latency between the SDN controller and the plurality of small cell network nodes.

19. The method of claim 18, further comprising the step of gathering at the SDN controller wireless and power consumption statistics for transmission over the control channel.

20. The method of claim 18, wherein the step of communicating further comprises:
- establishing the PAL control channel with the SDN controller for communicating the control channel information with each of the plurality of small cell network nodes using PAL interfaces associated with each of the plurality of small cell network nodes; and
- transmitting the control channel information over the PAL control channel.

21. The method of claim 20, wherein the SDN controller communicates data with the plurality of small cell network nodes over a general authorized access (GAA) channel of the citizens broadband radio services (CBRS) band that enables software defined networking.

22. The method of claim 21 further comprising routing data over GAA channel to the plurality of small cell nodes using multi-hop deployment.

23. The method of claim 18, wherein the plurality of small cell network nodes communicates uses a communications protocol comprising OpenFlow.

24. The method of claim 18 further comprising repairing local link failures with the plurality of small cell network nodes using fast failover group tables from OpenFlow.

25. The method of claim 18 further comprising estimating by the SDN controller a delay for each link between the SDN controller and the plurality of small cell network nodes to control path latency.

26. The method of claim 18 further including the steps of:
- configuring, by the SDN controller, the PAL control channel to include a plurality of subframes that may transmit either the control channel information or data channel information; and
- configuring, by the SDN controller, the GAA channel to include a plurality of subframes that transmit only the data channel information.

* * * * *

UNITED STATES PATENT AND TRADEMARK OFFICE
CERTIFICATE OF CORRECTION

PATENT NO. : 10,405,197 B2
APPLICATION NO. : 15/835078
DATED : September 3, 2019
INVENTOR(S) : Solyman Ashrafi It is certified that error appears in the above-identified patent and that said Letters Patent is hereby corrected as shown below:

On the Title Page

Item [54] and in the Specification, Column 1, Line 4, delete ""DATA PLAN" and insert therefor --DATA PLANE--

Signed and Sealed this
Third Day of May, 2022

Katherine Kelly Vidal
*Director of the United States Patent and Trademark Office*